United States Patent [19]

Burke et al.

[11] Patent Number: 4,637,022

[45] Date of Patent: Jan. 13, 1987

[54] INTERNALLY REGISTER-MODELLED, SERIALLY-BUSSED RADIO SYSTEM

[75] Inventors: Timothy M. Burke; Paul F. Smith, both of Ft. Worth; Eric R. Schorman, Bedford, all of Tex.

[73] Assignee: Motorola, Inc., Schaumburg, Ill.

[21] Appl. No.: 684,631

[22] Filed: Dec. 21, 1984

[51] Int. Cl.$^4$ .................. G06F 11/10; H04B 7/00
[52] U.S. Cl. .................. 371/37; 340/825.07; 455/31; 379/63
[58] Field of Search .................. 455/31, 33; 179/2 E, 179/2 EB; 371/37; 340/825.52, 825.07

[56] References Cited

U.S. PATENT DOCUMENTS

| | | | |
|---|---|---|---|
| 4,352,955 | 10/1982 | Kai et al. | 179/2 EB |
| 4,414,661 | 11/1983 | Karlstrom | 455/33 X |
| 4,430,755 | 2/1984 | Nadir et al. | 179/2 EB |
| 4,481,670 | 11/1984 | Freeburg | 455/33 |
| 4,486,624 | 12/1984 | Puhl et al. | 179/2 EB |
| 4,590,473 | 5/1986 | Burke et al. | 340/825.52 |
| 4,594,591 | 6/1986 | Burke | 340/825.07 |

Primary Examiner—Charles E. Atkinson
Attorney, Agent, or Firm—F. John Motsinger; Edward M. Roney; James W. Gillman

[57] ABSTRACT

In accordance with the present invention, there is provided a register-modelled radio system comprising a plurality of register-modelled processors having addressable registers for modelling the virtual state of the processor; a serial bus, interconnecting the register-modelled processors for communicating between the addressable registers; and a communications protocol for passing information to or from the addressable registers, whereby the virtual state of a radio portion may be determined or altered by, respectively, communicating information from or to the addressable registers. The communications protocol further comprises an information packet having an address, an operation code, optional data, and an error detection device, such as a cyclical redundancy check packet. The operation code is chosed from the group of primitive operation codes reset, read, write, bit set, bit clear, acknowledge, and negative acknowledge.

9 Claims, 9 Drawing Figures

INTERNALLY REGISTER-MODELLED, SERIALLY-BUSSED RADIO SYSTEM

CROSS REFERENCES TO RELATED APPLICATIONS

The instant patent application is related to the following patent applications filed on even date herewith and are hereby incorporated by reference thereto and made a part hereof as if fully set forth herein:

Serial Link Communications Protocol, bearing U.S. application Ser. No. 684,641, filed 12/21/84

Method of Communications Between Register-Modelled Radio Devices, bearing U.S. application Ser. No. 684,999, filed 12/21/84

Human-Engineered Radio Control Unit, bearing U.S. application Ser. No. 684,658, filed 12/21/84

THE FIELD OF INVENTION

The invention disclosed herein is concerned with radio design structures.

More particularly, this invention relates to two-way, mobile radio design structures.

BACKGROUND OF THE INVENTION

The need for this invention arose from problems of terribly inflexibly architected radio structures, from complex and unreliable cabling interconnections between radio peripheral components and from the general lack of human engineering as a design goal.

Current mobile radio products are designed around subsystem control options where each option is independent in function from one another, yet highly interdependent upon others for command and control. Accordingly, due to the high degree of interdependence, a total radio system to be envisioned prior to designing any individual subsystem. Typically, one or two major system components were responsible for orchestrating all of the command and control overhead for the other subsystems. The radio structure was constrained by the hardware, command and control structure envisioned at the design inception of the radio system. Later radio subsystems were difficult to accommodate because the basic structure had already been cast. Thus, the radio system, once architected, did not allow for convenient integration of new subsystems, features and enhancements.

Moreover, current mobile radios require fairly complex inter-cabling among option subsystems which are, often, exclusively located in the control head package. The radio to control head cabling is also complex, costly and unreliable. Each individual switch, control or indicator was separately hard-wired to the subsystem or option that it was to control. A mobile radio, fully configured, typically contains a birds-nest of cabling. For example, a 35 conductor cable is typical for full option capability. Thus, many of the field problems encountered with mobile radios have been attributed to faulty cabling and associated connectors of the control head system.

Others have serialized the heretofore parallel link between the control head and the basic radio. Still others have register-modelled the entire mobile radio system with respect to the R.F. link (U.S. Pat. No. 4,481,670 and U.S. application Ser. No. 402,682, now U.S. Pat. No. 4,590,473). However, none have internally, serially-bussed every subsystem interconnecting link and internally, register-modelled every device to form a completely new radio architecture.

Current control head packages are physically large when one or more subsystem option is configured and often require redundant circuitry for power supply and general interfacing.

Human interface is lacking due to the multiplicity of generic, cryptically-identified switches, power-consuming, cryptically-identified indicators and erroneous or non-existent operator feedback and verification.

Mode select systems where the radio may operate in a variety of communication environments and sophisticated data control systems are seriously limited in functional capabilities because of this current inflexible, confusing and complex approach.

The structure herein proposed, eliminates many of these problems and provides a method for future expansion with a STRUCTURED subsystem interface. Moreover, the concepts to be presented apply to dash-mount, trunk-mount and remote-controlled mobile radio systems, alike.

The instant invention solves the problem by internally, register-modelling and internally, serially-bussing the basic radio structure with addressable, "smart" peripheral radio subsystems to allow for inherent flexibility and expansion.

This invention represents a significant advance over the prior art and over this technical field by providing a reliable, internally, register-modelled, addressable, internally, serially-bussed mobile radio architecture with logical, human engineered control and operator validation feedback.

BRIEF SUMMARY OF THE INVENTION

It is the object of the present invention to provide a reliable, internally, register-modelled, addressable, internally, serially-bussed mobile radio architecture with logical, human engineered control and operator validation feedback.

It is a further object of the invention to provide incredibly flexibly architected radio structures.

It is another object of the invention to distribute the command and control processing among various radio subsystems, providing them with a greater degree of flexibility and autonomy.

Yet another object of the present invention is to provide simple and reliable cabling interconnections between radio peripheral components.

A further object of the invention is to employ a "smart" control head that may be multiplexed with each functional subsystem to facilitate operator input, output and feedback required for the command and control of each subsystem.

Another object of the invention is to provide a radio system capable of having a multiplicity of various radios, functions, features and enhancements in a single, mobile system without unnecessary redundancy of control heads and functional subsystems.

A final object of the invention is to provide logical, human engineered system control and operator validation feedback.

The ultimate object is to provide a reliable, internally, register-modelled, addressable, internally, serially-bussed mobile radio architecture with logical, human engineered control and operator validation feedback.

In accordance with the present invention, there is provided a register-modelled radio system comprising a plurality of register-modelled processors having addressable registers for modelling the virtual state of the processor; a serial bus, interconnecting the register-modelled processors for communicating between the addressable registers; and a communications protocol for passing information to or from the addressable registers, whereby the virtual state of a radio portion may be determined or altered by, respectively, communicating information from or to the addressable registers. The communications protocol further comprises an information packet having an address, an operation code, optional data, and an error detection device, such as a cyclical redundancy check packet. The operation code is chosen from the group of primitive operation codes reset, read, write, bit set, bit clear, acknowledge, and negative acknowledge.

Thus, there has been provided a reliable, internally, register-modelled, addressable, internally, serially-bussed mobile radio architecture with logical, human engineered control and operator validation feedback.

BRIEF DESCRIPTION OF THE DRAWINGS

Additional objects, features, and advantages, in accordance with the present invention, will be more clearly understood, by way of unrestricted example, from the following detailed description, taken together with the accompanying drawings, in which.

The invention will be readily appreciated by reference to the detailed description when considered in conjunction with the accompanying drawings in which like reference numerals designate like parts throughout the figures.

THE DESCRIPTION OF THE PREFERRED EMBODIMENT

Figure 1:
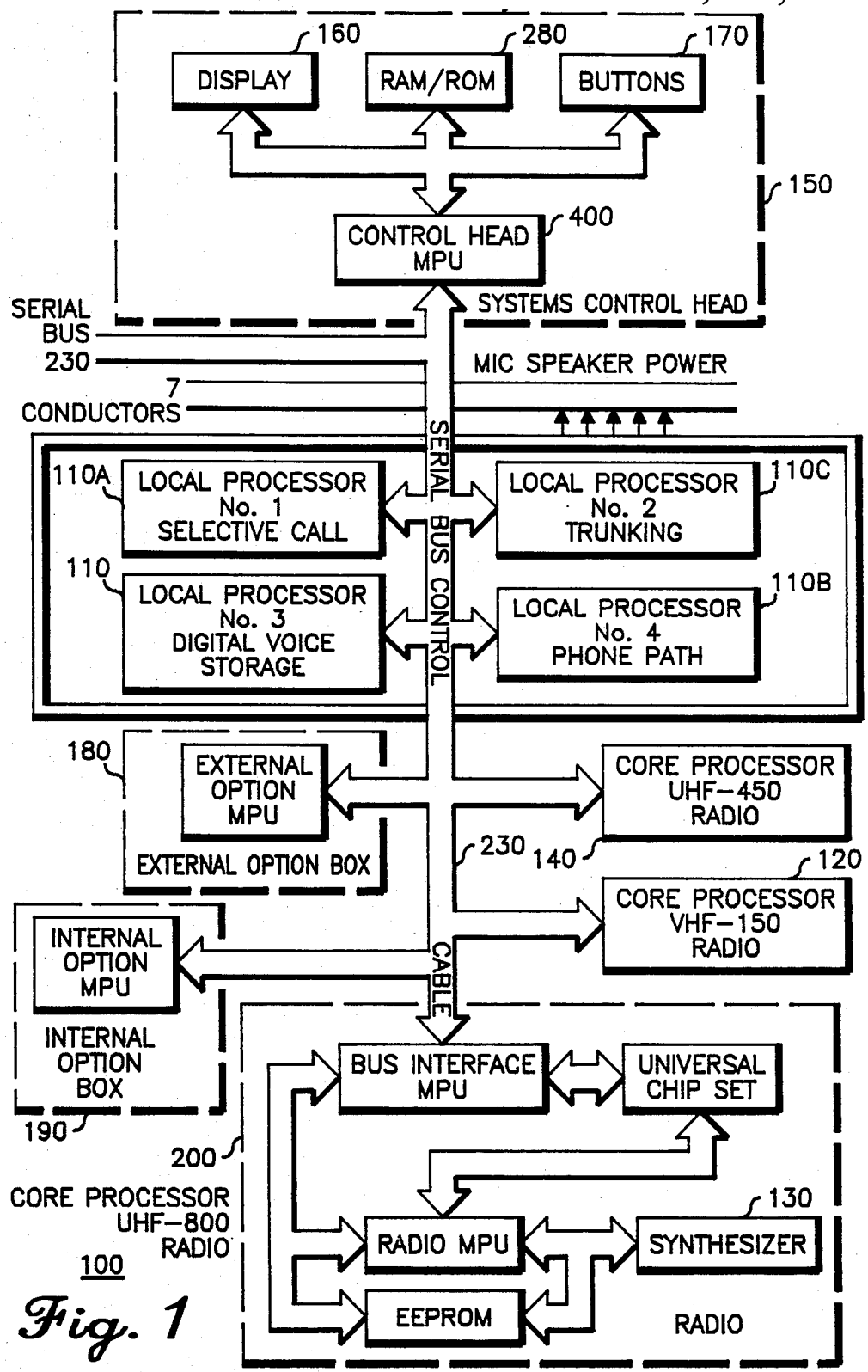
FIG. 1 is a block diagram illustrating a reliable, internally, register-modelled, addressable, internally, serially-bussed mobile radio architecture with logical, human engineered control and operator validation feedback in accordance with the preferred embodiment of the present invention.

FIG. 1 is a block diagram illustrating a reliable, internally, register-modelled, addressable, internally, serially-bussed mobile radio architecture with logical, human engineered control and operator validation feedback in accordance with the preferred embodiment of the present invention.

Figure 2:
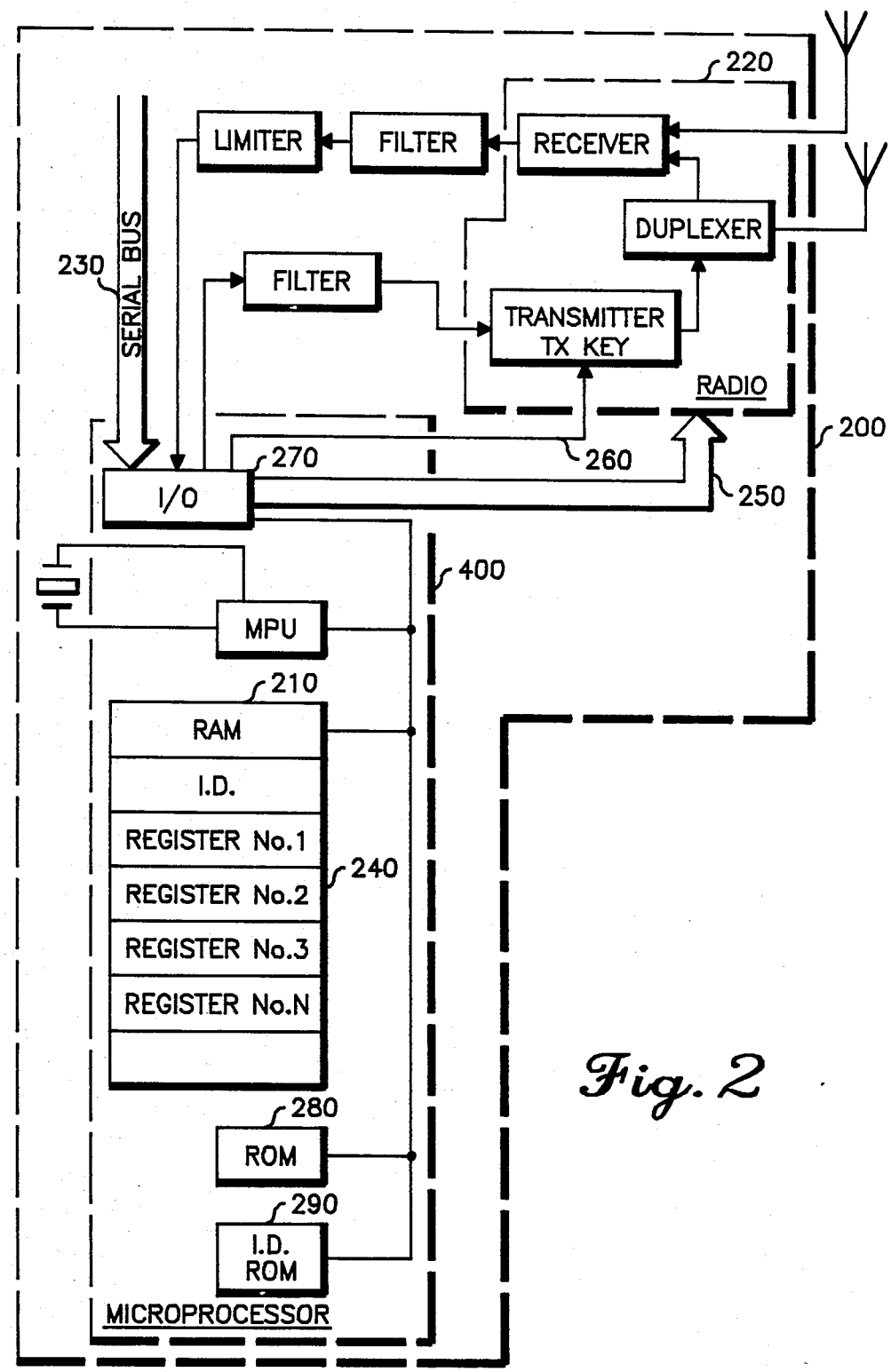
FIG. 2 is a block diagram illustrating the general internally register-modelled structure that is representative of each subsystem.

FIG. 2 is a block diagram illustrating the general internally register-modelled structure that is representative of each subsystem. This basic structure provides the radio system the capability of having a multiplicity of various radios, functions, features and enhancements in a single, mobile system without unnecessary redundancy of control heads and functional subsystems.

The General Register Model

As illustrated in FIG. 2, a general approach to radio system design is offered by viewing a radio peripheral 200 as a digital machine that contains a set of defined, addressable registers 210. The contents of the set of registers 210 can then be used to define the operations that a radio device 220 is to perform and the virtual state of the device 220, peripheral, or subsystem 200 at any point in time.

To manipulate the contents of the registers 210 which control the device 220, a small set of general, primitive instructions has been defined. The most primitive are instructions to read or write (alter) the contents of an addressed register 210. These primitive instructions are transmitted over a bus 230 to cause data to be written into, read from, modified, or tested with respect to any addressed register 240 in the peripheral 200. The primitive instruction set and transmission format remain the same for all peripherals 200; independent of future functional enhancements that may be added to the device 220, peripheral 200, or the various combinations of different peripherals 200 that might comprise future systems (FIG. 1).

Since the functions of the various peripherals 200 are controlled by the contents of its register set 210 and each register's contents 240 can be addressed by a single instruction; combinations of similar primitive functions (macros) can be invoked to perform new major peripheral 200 or device 220 function in parallel. This feature provides the capability for a peripheral 200 to respond to new "commands" without actually implementing new command operation codes in the peripheral 200. The primitive instruction set can remain stable, promoting upward compatibility of peripherals 200.

A conceptual architecture for integrating current and future system options and command/control subsystems with common linkages into a structured unified two-way mobile radio system is further disclosed and illustrated in FIG. 1.

General

What is disclosed in FIG. 1 is a multi-processor system utilizing a common serial linkage 230 for parametric data transfer and system control. Each major system option or function is independently performed by "local" processors 110 (i.e., peripherals 200) and interfaced to the system on a serial data link 230.

Several definitional terms are used to describe the four basic elements of the system: the CORE processor 120, 140 and 200, the CONTROL processor 150, LOCAL processors 110 and the linkage BUS 230. The minimum system contains the Core processor 200, the Control processor 150 and the Bus 230.

The CORE processor 200 directly interfaces to the radio 220 (FIG. 2) and performs many of the low-level tasks 250 (FIG. 2) associated with a particular radio. These tasks may include synthesizer/element control 130, transmit power level control, audio muting, channel scanning logic, receive/transmit and transmit/receive sequence timing 260 (FIG. 2), subaudible signalling generation and detection, hardware diagnostics, etc. 250 (FIG. 2).

The Core processor 200 also provides an interface 270 (FIG. 2) to the serial Bus 230 where each of the relevant tasks are available to the Control processor 150 or other Local processors 110 on the Bus 230.

The Core processor 200 is simply a collection of various "drivers" 210/280 (FIG. 2) that intimately define the radio interface. The drivers are controlled or scheduled by the Control processor 150 or Local processors 110. The interface to the drivers consists of a structured map 210 which defines the entry and exit parameters 240 necessary to perform the function of the driver 280.

As an example consider the driver which changes the radio's 200 frequency. One radio 200 contains a frequency synthesizer 130 requiring 24 bits of information, control and timing signals and a refresh protocol. Another radio 120 contains channel elements requiring simple element selection logic.

The driver for the first radio 200 is unique and much more complex than the driver for the other radio 120. However, both drivers contain a "common" standard for interface to the system, i.e., the driver parameters 240 (FIG. 2) are standard enough to allow use of that driver 280 (FIG. 2) by other processors in the system 100.

The Core processor 200 should be as simple as possible to interface to the radio hardware 220 (FIG. 2) without an integrated operating system. The Control processor 150 or Local processors 110 provide the necessary logic to control the system 100.

The Control processor 150 (i.e., control head) provides the human interface to the system 100 and is common to all radio products 120, 140 and 200. Its primary function is to control the display 160 and keyboard 170 entry of data and control information. It also acts as a system monitor providing status information to the user.

The Control processor 150 also interfaces to the serial bus 230 providing access of its drivers 280 to other processors 110 in the system 100 in a standard fashion. As a control element, it provides the operating system logic for the Core processors 120, 140 and 200 and Local processors 110.

Any and all unique parameters 280 of the system 100, such as frequency information, Unit ID codes 290 (FIG. 2), PL/DPL codes, mode linkages, scan lists, etc., are provided to all system peripherals 200, 110, etc. by the Control processor 150. It provides the "data base" 280 of the system 100 and transfers this information over the bus 230. This does not imply that the non-volatile code information 290 (FIG. 2) is, necessarily, resident in the Control processor 150. It does imply that any and all relevant code information may be obtained 290 (FIG. 2) or modified by the Control processor 150.

An example is provided by the PL/DPL drivers 280 resident in the Core processor 200. The total set of possible seed codes for PL and DPL may be hard programmed in the Core processor memory 290. This data base 210, 280 and 290 will be accessible to the Control processor 150 for distribution 230 to other Local processors 110 requiring the codes, i.e., Local processors 110 must go "through" the Control processor 150 to obtain the codes. The Control processor 150 may also contain its own data base 280 of parametric information.

The keyboard system 170 of the Control processor 150 will be general enough to accommodate simple mode control systems and sophisticated data entry systems. Various levels of entry modes will be available to multiplex the use of the keyboard 170 and display 160.

The simple mode controlled systems will use a one-to-one mapping (i.e., so-called "soft" keys) of the keyboard keys 170 for mode selections.

Analog control functions, such as, volume and squelch will be controlled from the keyboard 170 in digital form and then converted to analog form by the Core processor 120, 140 and 200.

The display system 160 will include alphanumeric graphics with user prompt (i.e., so-called menu) logic and error control logic with operator feedback. The display system 160 is controlled by the Control processor 150 and is accessible 230 to other Local processors 110 in the system 100 for status and monitoring purposes as well as keyboard 160 entry feedback.

The Local processors 110 provide the options 180 and expansions of the system 100. Major communications functions, such as Digital Voice Storage, Telephone signalling, Multi-frequency and Single-frequency trunking, etc., are all Local processor systems 110.

Local processors 110 may be mated to the serial bus 230 internal to 190 or external to 180 the radio package 200. Local processors requiring interface to the audio, detector and modulator circuits 190 are located within the radio package 200. However, all control and data is communicated on the serial bus 230.

All Local processors 110 have a common structured interface allowing their use with all radio products 110, 120, 140, and 200 and option subsystems 180 and 190. This approach eliminates the redesign of these major systems for each particular radio configuration, which is the general approach used today. It makes the system 100 "I/O independent."

The serial Bus 230 provides the physical interface of all processors 110, 120, 140, 150, 180, 190 and 200 in the system 100. It consists of a 2-wire link (signal and ground) and may be bussed internal 190 to the radio as well as external 180. When used externally, the cable may be twisted-pair, shielded-audio or fiber-optic. The link may also be remoted via infrared, ultrasonic or RF.

Figure 3:
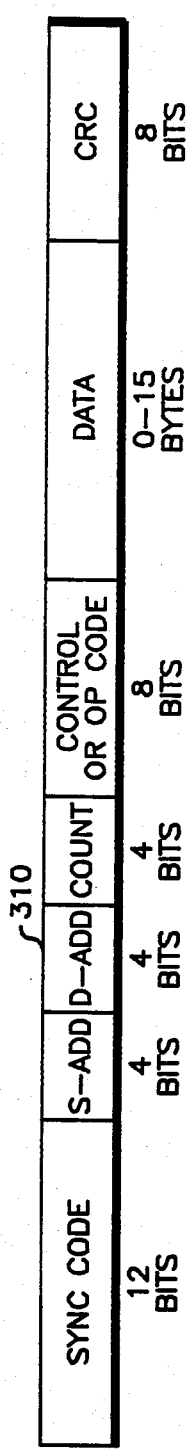
FIG. 3 is the serial link communications protocol according to the present invention.

The communications protocol, illustrated in FIG. 3, is designed for simplex operation of synchronous data packets containing source and destination addressing, control, data and error detection codes.

It is desirable that the Control 150, Core 120, 140 and 200 and Local processors 110 perform all of the required signalling required for the Bus 230 interface to reduce the costs of the system 100.

Core Processor

Returning to FIG. 2, the Core processor 200 provides the interface to the radio hardware system 220 and the serial Bus 230. It does so by implementing various drivers 280 that are generic to that hardware configuration.

Control Drivers

The drivers 280 make up the essential control elements that are necessary to "drive" the commands generated by the Control processor 150 and Local processors 110. In this regard, the drivers 280 are global and accessible to all other elements on the Bus 230.

Each driver 280 contains a Bus 230 interface specification that is unique to the function the driver performs and standard among Core processors 120, 140 and 200. An example will illustrate this approach.

Consider the driver used to select the current receive frequency of the radio. The example uses three methods of frequency selection by three unique radio products and their associated Core processors 120, 140 and 200.

Figure 4:
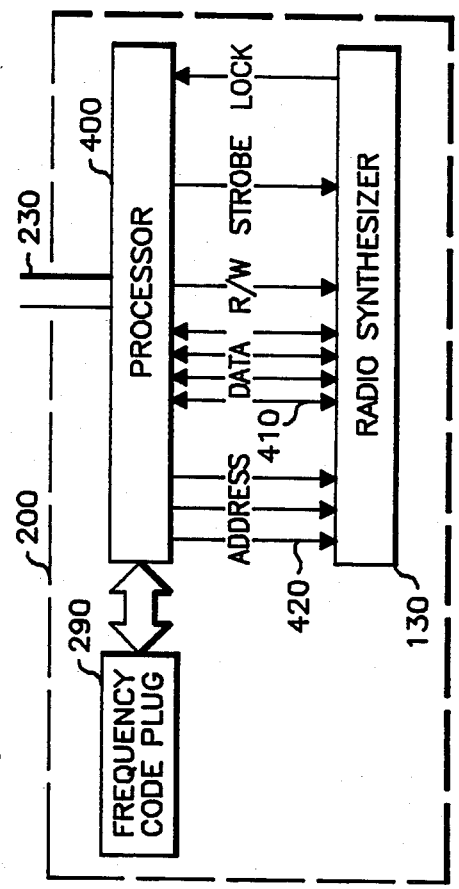
FIG. 4 is register-modelled synthesized radio according to the preferred embodiment of the present invention.

Referring to FIG. 4, the first radio 200 contains a synthesizer 130 requiring 24 bits of raw data for frequency selection. The data is provided by the Core processor 400 in a parallel fashion by way of a 4-bit bidirectional data bus 410 and a 3-bit address bus 420. The Core processor 400 may read or write the synthesizer data by selecting one of the "N" addressable registers 210 (FIG. 1) contained within the synthesizer system and strobing the appropriate data.

After writing new data into the synthesizer 130, the Core processor 400 may read the register contents 210 to verify the write. If the write operation was successful, the command is considered complete. If the write was not successful, an error status is reported 230 to the command originator. This system does not require a "refresh" operation by the Core processor 400.

Returning to FIG. 2, the driver 280 to select the current receive frequency of the first radio 200 requires two entry parameters and one exit parameter. The entry parameters 240 are the receive frequency name, (e.g., RF-1, RF-2, RF-5, etc.) and the address of the device originating the command. The exit parameter is an error control code that is returned 230 to the device originating the command. Error-0 designates a successful operation, Error-1 designates a faulty wire operation and Error-2 designates an improper entry parameter selection.

Upon entry, the driver 280 takes the frequency name and cross-checks that name with available receive frequencies stored in the frequency codeplug 290. If the name is valid, the driver 280 obtains the 24 bits of raw data from the codeplug 290 and attempts to change the receive frequency. If the name is invalid, the driver 280 signals 230 the originating device with an Error-2 parameter 240.

The driver 280 then goes through the procedure to write the receive frequency data to the synthesizer 130. The written data is then read for verification. If the write was successful (data properly loaded and synthesizer locked), the driver signals the originator with an Error-0 parameter. If the write was faulty, an Error-1 parameter is signalled.

If at any time the synthesizer 130 should go out of lock, the Core processor 400 may signal 230 the last originating device with an Error-1 parameter.

Figure 5:
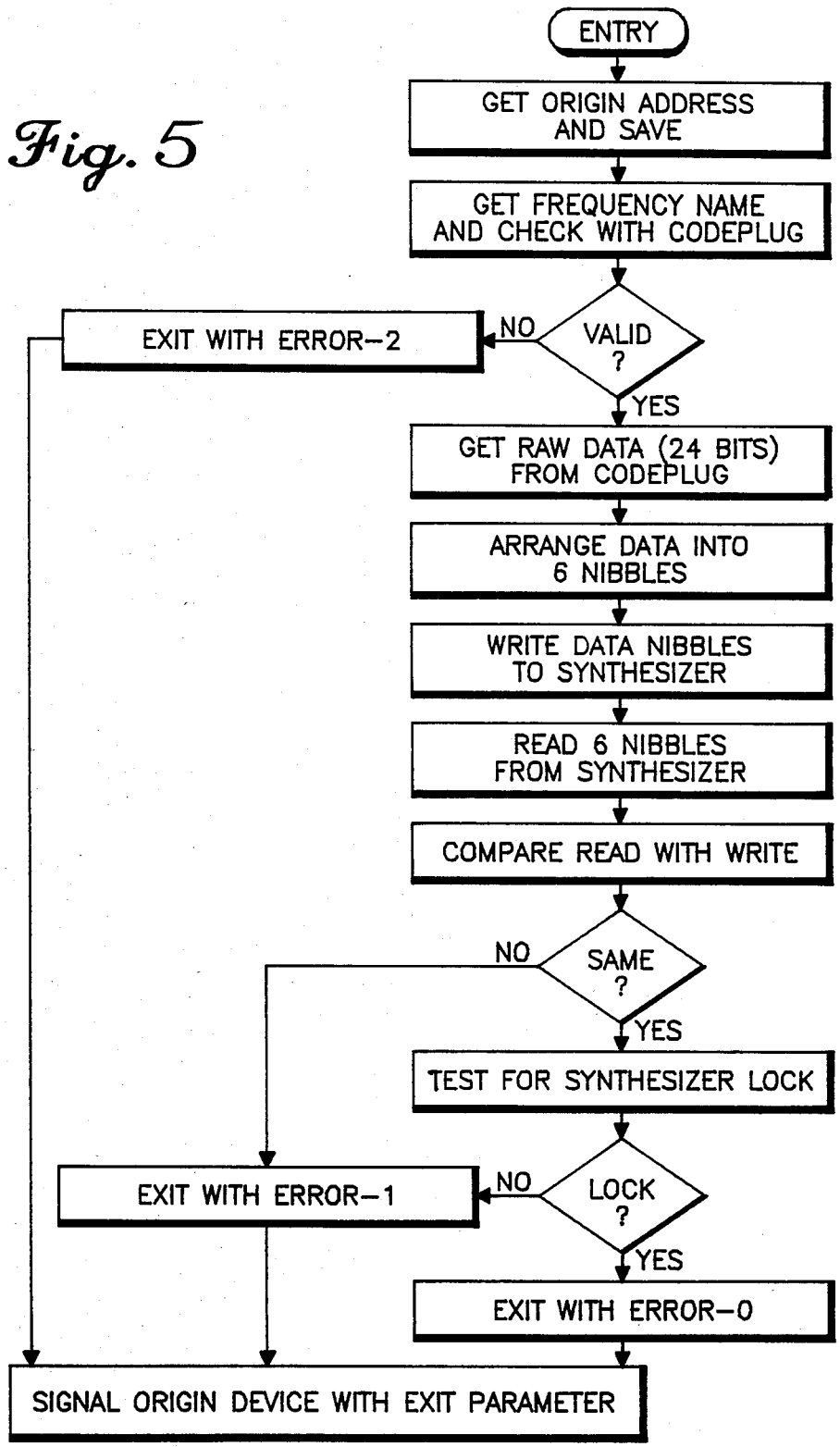
FIG. 5 is an exemplary flow diagram of a device driver routine for the synthesized radio of FIG. 4.

The flow diagram of the receive frequency driver for the first radio 200 is shown in FIG. 5.

Figure 6:
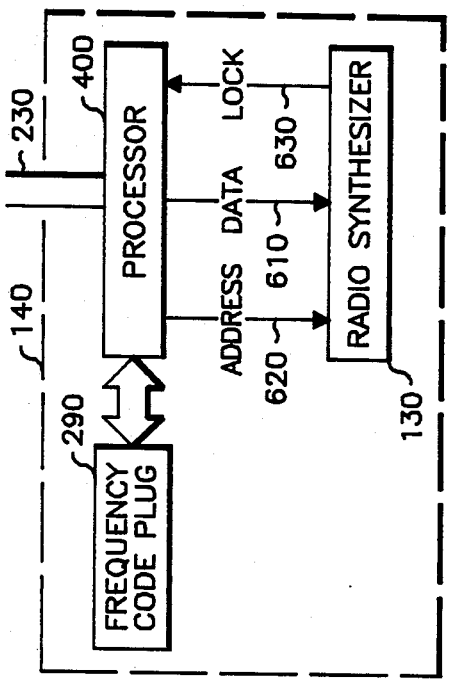
FIG. 6 is another register-modelled synthesized radio according to the preferred embodiment of the present invention.

A second radio 140, illustrated in FIG. 6, also contains a synthesizer system 130 for frequency selection. Unlike the first radio 200, the synthesizer 130 of the second radio 140 requires a serial load operation with 20 bits of raw data and does not allow the Core processor 400 to read the synthesizer register contents 210. For reliability purposes, the Core processor 400 must refresh the synthesizer 130 periodically.

The Core processor 400 of the second radio 140 must provide the standard entry and exit interface as outlined for the first radio 200 and provide the proper timing and control required for the synthesizer 130. This may include assembly of the data 610 into the proper serial format, generating the serial clock 620, generating start/stop bits, etc.

The driver 280, to select the current receive frequency of the second radio 140, requires the same entry and exit parameters 210 as the first radio 200 (i.e., frequency name and originating device address for entry and error control code for exit). Thus, the instruction sequence and operation codes to be transmitted in the bus communications protocol are identical for all radios 120, 140 and 200.

More particularly, in the second radio 140, upon entry, the driver 400 cross-checks the frequency name with the frequency codeplug 290 and reports an error if the name is invalid. The driver 400 then obtains the 20 bits of raw data from the codeplug 290 and attempts to change the receive frequency by properly formatting the serial data 610 and generating the proper timing signals 620.

Since the loaded data 610 of the second radio 140 may not be read by the Core processor 400, a refresh operation must be performed periodically and an Error-1 exit parameter will be signalled 230 to the originating device only if synthesizer 130 lock 630 is not achieved. Otherwise, an Error-0 code is signalled 230.

Figure 7:
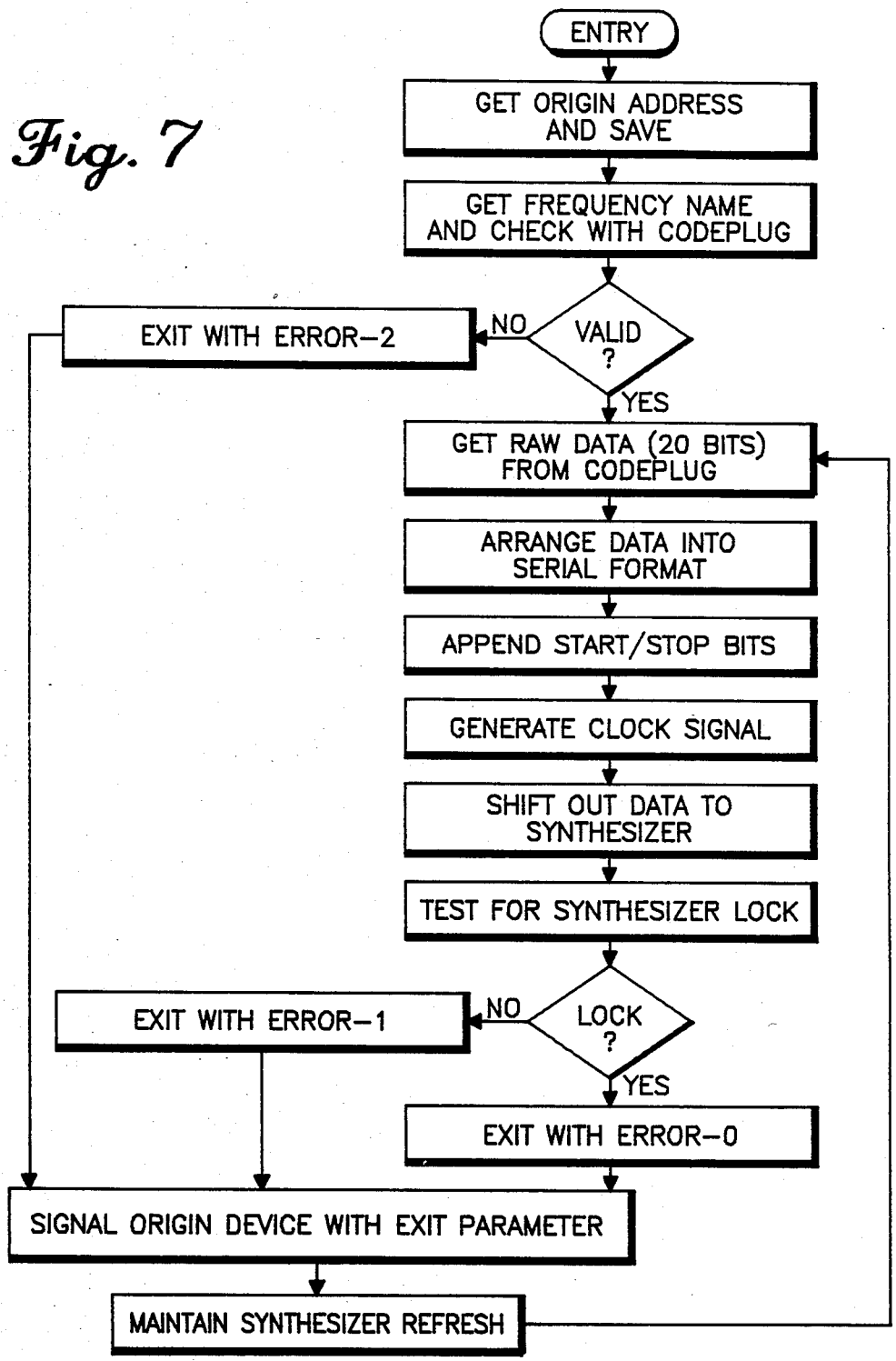
FIG. 7 is an exemplary flow diagram of a device driver routine for the synthesized radio of FIG. 6.

The flow diagram of the receive frequency driver for the second radio is illustrated in FIG. 7.

Figure 8:
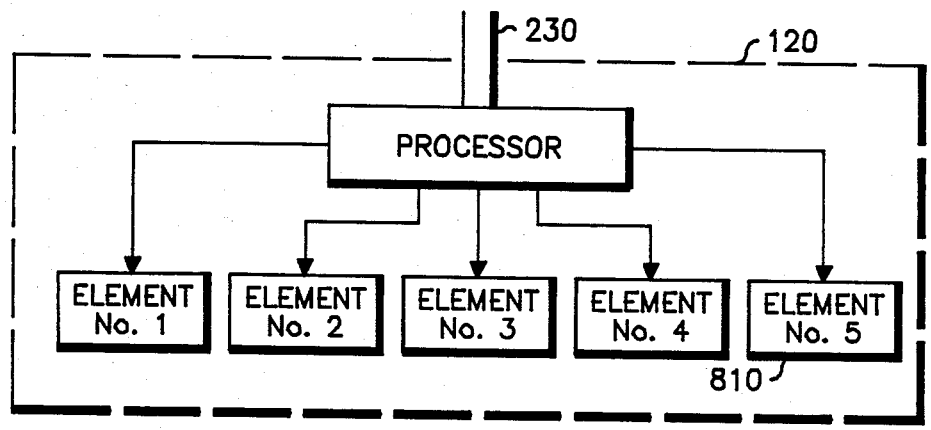
FIG. 8 is a register-modelled channelized radio according to the preferred embodiment of the present invention.
Figure 9:
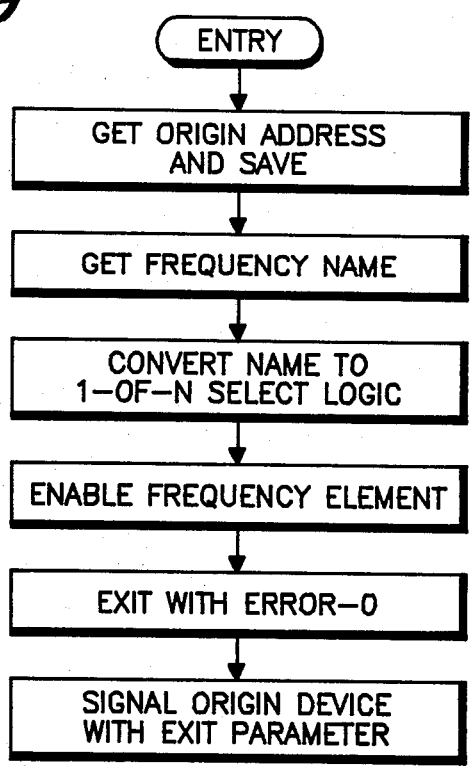
FIG. 9 is an exemplary flow diagram of a device driver routine for the channelized radio of FIG. 8.

Illustrated in FIG. 8 is a third radio 120 that does not contain a synthesizer. Frequency generation is accomplished through channel elements 810. The current receive frequency is selected by simply gating on one-of-N elements 810. FIG. 9 illustrates the flow diagram for changing the frequency in the third radio 120.

In comparing the drivers of the first 200, second 140 and third 120 radios, note that the Bus interface specification is identical in all three radios. This approach provides the "I/O independence" of the Core processor allowing common access by the Control processor 150 and Local processors 110 within the system 100.

Thus, only the Core processor 120, 140 and 200 need be designed for each new radio product to mate with existing options 110, 150, 180 and 190.

The total set of singular control drivers will vary from radio to radio and need not be restricted to present control functions. For example, the first radio 200 may contain 5 drivers: Select transmit/receive frequency, Select PL/DPL seed code, Select audio muting mode, Select transmit mode and Select receive mode.

The second radio 140 may contain 10 drivers which include all of the drivers of the first radio 200 plus, for example: Select channel scan mode, Update scan list, Select priority channel for scan, Select default scan transmit frequency and Select scan interrupt logic. The second radio 140 would be a superset of the first radio 200.

The Control 150 and Local 110 processors may be designed to accommodate all Core processor drivers and have the capability to recognize which Core processors are resident in the system 100. Moreover, it is possible, for backward compatibility, that any new Core Processor designs provide the drivers (or equivalents) of previous designs.

One possible set of singular drivers that may be implemented in a Core processor is as follows:

SELECT RECEIVE FREQUENCY
SELECT TRANSMIT FREQUENCY
SELECT PL/DPL RECEIVE CODE
SELECT PL/DPL TRANSMIT CODE
SELECT AUDIO MUTE MODE
ENABLE/DISABLE PL/DPL TRANSMIT/RECEIVE
SELECT AUDIO VOLUME LEVEL
SELECT CARRIER SQUELCH DETECT LEVEL
SELECT TRANSMIT POWER LEVEL
ENABLE/DISABLE TRANSMIT CIRCUITS
ENABLE/DISABLE STANDBY POWER MODE

SELECT TRANSMIT TIME-OUT TIME
SELECT MODULATION CHANNEL
ENABLE/DISABLE DIAGNOSTICS MODE
UPDATE CHANNEL SCAN LIST
SELECT SCAN PRIORITY SAMPLE FREQUENCIES
ENABLE/DISABLE SCAN MODE
ENABLE/DISABLE SCAN INTERRUPT LOGIC
ENABLE/DISABLE SCAN STATUS REPORTING
SELECT SCAN TRANSMIT DEFAULT FREQUENCY
ENABLE/DISABLE DIAGNOSTIC STATUS REPORTING
SELECT SCAN SERVICE LOGIC
UPDATE CODEPLUG PROGRAM LIST
PROGRAM CODEPLUG
READ CODEPLUG CONTENTS
INITIALIZE SYSTEM
ENABLE/DISABLE RECEIVE/TRANSMIT STATUS REPORTING
ENABLE/DISABLE PUBLIC ADDRESS MODE
MACRO COMMAND PROCESSORS
MACRO CONTROL DRIVERS

Many of the drivers presented above require parametric data transfer to and from the originating device. The structured Bus 230 allows for addressing and execution of each individual driver. However, to address a driver, a fair amount of data transfer must take place which takes time.

Certain processes require a series of events to take place (i.e., a series of drivers must be executed to complete the process that the device was instructed to perform). As an example, consider switching the radio from receive mode to transmit mode resulting from the operator pressing the Push-To-Talk switch. The drivers required are: (1) selecting the transmit frequency, (2) selecting the transmit PL/DPL code, (3) selecting the modulation channel, (4) selecting the transmit time-out time, (5) disabling the receive mode, (6) selecting the power output level, (7) enabling the transmit control circuits and (8) enabling the PL/DPL encoder.

The Control processor 150 (or Local processor 110) could perform this series of events by signalling 230 the Core processor for each event. However, this would take too much time and would burden the Control processor 150. Moreover, the series of events may be different from one Core processor to the next, which blemishes the I/O independence.

To alleviate this problem and speed up the process, Macro Control drivers are used. Macro drivers simply link the execution of individual drivers to form a process. The linkage will occur at the microprocessor 400 machine speed rather than at Bus 230 speed.

Macro drivers are split into two modes: setup and execution. The setup mode passes 230 and retains 210 all of the parameter data required to execute the Macro. The execution mode links the individual drivers 280. Processes requiring fast response times may require Macro setup at system initialization.

Individual parameters 210 (such as, transmit frequency, PL/DPL code, etc.) may be updated as necessary internal to the Core processor without status reporting to the Control processor 150. One such process would be the switching from receive mode to transmit mode and the converse. Other Macro control drivers of the Core processor are:

CHANNEL SCAN PROCESS
PL/DPL DETECTION
STATUS REPORTING
SYSTEM DIAGNOSTICS

Diagnostic Drivers

Each element of the system 100, including the Core processor, contains diagnostic drivers to test the integrity of the system. Diagnostic reporting is maintained through the Control processor 150 of "off-line" via specialized test equipment.

Two types of diagnostic feedback are provided to the operator: fatal and non-fatal. A fatal report will result if the Core processor 400 or Control processor 150 fails to acknowledge command signalling 230 or if one of the major hardware elements fail 220. A non-fatal report will occur if one of the Local processors 110 fail interrogation of the Control processor 150 or if a minor element of the radio hardware fails.

Core Processor Addressing

Referring to FIG. 3, each element in the radio system 100 contains a unique address that is primarily used as enable logic. Four bits 310 are used for destination processor 400 selection. This will allow up to 15 major peripherals to be resident on a single Bus 230. The three lowest-order addresses 0H through 2H) are reserved to Core processor 120, 140 and 200 addresses.

Thus, up to three Core processors 120, 140 and 200 may reside on a single Bus 230. This allows for multi-radio installations as illustrated in FIG. 1. Only one Control processor 150 is necessary to control the operation of three radios, such as High-Band, UHF-450 and UHF-800, for example.

Local processors 110 may be shared among the three radios 120, 140 and 200.

Core Processor Status Reporting Drivers

Drivers 280 are included in the system's Core processor 400 to report the status of various control signals, such as channel activity, PL/DPL detect, synthesizer lock, standby mode, transmit power, etc.

These drivers 400 are normally interrogated by the Control processor 150 (or Local processor 110) or may be combined with a Macro driver for continuous monitoring.

Codeplug Programming

It is desirable that nonvolatile parameters 290 of the Core processor 400 (or the rest of the system) which are normally stored in codeplug 290 be programmable via the Bus 230. The control element may be the Control processor 150 or external equipment.

This will allow personalization of each system 100 to be dynamically and automatically configured via factory computers. Systems 100 may be easily reconfigured in the field and no alternative codeplug 290 stocking is required.

Analog Control

Audio volume level and carrier squelch circuits are controlled via analog potentiometers in the control head 150 and are normally under user control. A four bit word is output by the Core processor 400 to provide 16 levels of audio volume and 16 levels of squelch attack. A D/A converter following the Core processor 400 will provide a DC level to the volume and squelch circuits 220. The volume D/A is logarithmic and the squelch is linear.

The drivers 280 for volume and squelch will be accessible to the Control processor 150 and Local processors 110. The user will have the capability to set a precise level via the Control processor 150 keyboard 170 or simply ramp-up or ramp-down to a desired level.

Local processors 110 will be able to set fixed volume and squelch levels for selective calling and transmit inhibit logic, respectively.

Modulation Channels

Many of the Local processor systems 110, like Digital Voice Storage, Trunking, Digital Voice Privacy, Queued Community Repeater, etc., are R.F. signalling systems requiring access to the modulator circuits. This system provides four channels for this function internal to the radio package 220. The channels are controlled through the Core processor 400 and assignments are made by the Control processor 150. Local processors 110 may override these assignments.

Three of the four channels are processed by the radio circuits, providing AGC, preemphasis and splatter filtering. The remaining channel is routed directly to the modulator and is normally used for baseband data systems, such as Trunking and Digital Voice Privacy.

Transmit Power Level

This system 100 provides two bits of transmit power level control allowing up to four discrete levels of transmit power. The Core processor 400 controls the interface and assignments are made from the Control Processor 150 or Local processors 110.

Power Standby Mode

Drivers 280 are provided in the Core processor 400 to place the radio hardware in the standby mode to reduce system power consumption. The driver 280 will retain all current parameters 210 of the system 100 and allow a timed transition from full-power to standby. The Core processor 400 will retain power during standby and Local processors 190, within the radio package, have the option of standby control. The control processor 400 (or Local processor 110) may also control the standby mode.

Channel Scan

Channel scan systems require direct interface to the radio hardware 220. The Core processor 400 will provide the necessary drivers 280 to perform the scan logic.

However, the parameters 210 of the scan are provided by the Control processor 150 or a separate scan Local processor 110. The parameters 210 include: non-priority scan list, priority scan list, transmit default frequency, etc. Scan status will be available to the controlling element for further control, such as PL/DPL scan or signalling controlled scan.

Public Address Mode

The Core processor 400 will have the capability to patch one of the four modulation channels 250 directly to the audio control circuits bypassing the receiver circuits. This will allow Public Address modes that are necessary for certain systems including Digital Voice Storage.

Control Processor

The Control processor 150 provides the human interface to the system. It does so by way of a keyboard system 170 and display system 150. It 150/280 also defines the configuration of the system 100.

Keyboard System

The keyboard system 170 is composed of a matrix keyboard and various drivers 280 that interface 400 with the Bus 230. The drivers 280 are locally controlled by the Control processor 150/400 and remotely controlled by Local processors 110.

There are two basic keyboard configurations available to the user and are normally system dependent. The dynamic configuration allows for full data entry and option selection via so-called "soft" key identification. The static mode allows for a one-to-one mapping (i.e., so-called "menu" mapping) of the keys to codeplug defined modes.

With the static configuration, the operator need only press one or two keys to define the current operating mode of a radio subsystem. The selected mode will define the transmit and receive frequencies, scan list and logic, transmit time-out time, PL/DPL transmit and receive codes, etc. It will also place any Local processors 110 into their "default" run mode.

The controlling parameters of the static mode configuration, that apply to radio operation, may be resident in both the Core processor 400 and the Control processor 150 and are initialized at system power-up.

The dynamic mode allows all of the capabilities of the static mode plus extended control and data entry. For example, the operator will be able to enter his own priorities and non-priorities for channel scan, select his Unit and Group IDs with the Select Call Local processor 110(A), select any desired muting modes, select a telephone patch 110(B), etc.

Keyboard entry feedback will be provided with tones and display techniques. Complex entries are handled through logical, human engineered prompting (i.e., menus) on the display with error control logic.

Three drivers are used for multiplexed access of the keyboard and display: single key, multiple key and command parsing. The Control processor 150 uses all three drivers and provides access to Local processors 110. The single key and multiple key drivers are available to Local processors 110 for data entry and may bypass the Control processor 150. Command parsing is performed exclusively by the Control processor 400.

Display System

The display system 160 provides two major functions: keyboard 170 entry feedback with prompting and system status reporting. The display 160 is a character dot matrix with graphics capability under direct control of the Control processor 150.

The display drivers 280 are used by the Control processor 150 and Local processors 110 to provide entry feedback and status monitoring of the system.

System Control

The Control processor 150 is the primary interface and operating system of the Core processor 400/120, 140 or 200 and defines the minimum system. It also controls the interface of Local processors 110 in the system 100. At initialization time, the Control processor 150 interrogates all of the possible board addresses and configures the system 100 to recognize only relevant addresses.

The control processor 150 provides the Bus 230 synchronization and timing.

Local Processors

Local processors 110 provide the options and expansions of system 100 and are mated to the serial Bus 230 internally 190 and externally 180 to the radio package 200.

Each Local processor board 110 contains a programmable address for each major function. Local processor systems 110 may be combined on a single board with the same address and utilize the same bus interface 230.

Local processors 110 communicate with the Control processor 150 and the Core processor 400 as an integrated system. The Bus interface is structured and standard to all Local processors 110 which allow their use with all radio products 120, 140 & 200 and option systems 180 and 190.

While the Local processors 110 are not stand-alone systems, a system radio may add or delete Local processors 110 from the system 100 without hardware or software modifications. The Control processor 150 will recognize the change. Thus, the radio system 100 becomes installation and I/O independent, increasing the reliability of the communications system 100.

Local processor default parameters 280/290 always reside with the Local processor hardware 400 and not with the Control processor 150. However, the Control processor 150 may alter various parameters 210 of the Local processors 110 under control of the Local processor 110. For example, consider the Local processor for Select Call 110(A).

The Select Call system 110(A) requires a codeplug 290 to be resident containing the Unit, Group and Fleet Identification codes, muting mode and system configuration. By way of the Control processor 150, the operator may change the Unit and Group ID codes but will not be able to change the Fleet code or configuration. Changing the Unit code does not replace the hard-programmed Unit code 290 but simply provides a "temporary" 210 Unit code by which the radio may be addressed.

It is up to the individual Local processor 110 to decide on the volatility of its parameters.

Local processors 110 that demand system control, such as Trunking 110(C) and Queued Community Repeater, may bypass the control of the Control processor 150 and make it a "slave" to the Local processor 110. In this mode, the Control processor 150 will continue to provide the Bus timing and synchronization and operator interface but does not control the system 100.

The Control processor 150 may have the capability to place Local processors 110 on-line or off-line due to a fault in the system or reconfiguration. For example, the operator may mode select 170 which channels are Trunked or Conventional.

The following represents a list of possible Local processor systems:

SELECT CALL
DIGITAL VOICE STORAGE
QUICK CALL II
TELEPHONE PATCH
MULTI-FREQUENCY TRUNKING
QUEUED COMMUNITY REPEATER
SINGLE TONE ENCODE/DECODE
DIGITAL VOICE PRIVACY
ANALOG VOICE SCRAMBLER
CONSOLE SYSTEM
DATA TERMINAL
SCAN
LORAN-C LOCATION SYSTEM
ZVEI/CCIR SIGNALLING

Serial Bus

The serial Bus 230 provides the physical interface of all processors 400 in the system. It consists of a 2-wire link (signal and ground) and may be bussed internal 190 to the radio as well as external 180.

Synchronous Data

The system Bus 230 is fully synchronous using baseband data at 2400 bits per second. No clock signal is required since clock recovery is performed by each of the system processors. (Due to the speed requirements of the system and the response times necessary for various commands, a preprocessor may be required for some of the Local processors 110. The preprocessor is a simple 4-bit machine that performs all of the necessary signalling to interface with the serial bus 230. This includes signalling intensive systems like Select Call 110(A) and Trunking 110(C).)

Control Processor Polling

Referring to FIG. 3, signalling among processors 400 in the system 100 is accomplished through variable sized data packets. The data packets are asserted on the bus asynchronously or by way of a polling format generated by the Control processor 150.

Each data packet consists of a 12-bit sync code, 4-bit source address, 4-bit destination address, 4-bit byte count, 8-bit operation code, from 0 to 15 data bytes and an 8-bit Cyclically Redundancy Check (CRC) code.

The sync code and source address are generated by the control processor 150 with the poll format found in FIG. 10. The dead period is 4 bits long and is the zone where an asserting processor 400 will place the destination address. Upon recognizing a valid address in the dead zone, the Control processor 150 will relinquish control of the bus 230 and resume control at the end of the data packet CRC code, where the poll will continue.

Control Processor Priority

Since the Control processor 150 controls the poll addressing (or sequencing), it may assert control at any time and establish priority over other processors in the system 100. This feature allows fast response times to operator inputs, such as Push-To-Talk and mode selections, etc.

Command Acknowledgement

All commands issued by the Control processor 150 or Local processors 110 are acknowledged in this system 100. The acknowledge packet must occur within the next poll cycle or retransmission will result. The number of retransmissions will be limited and the operator will be informed of a fault if the destination processor 400 fails to respond.

Dynamic Addressing

Each of the Local processors 110 and the Core processor 150 contain a hard-programmed board address that is used in select logic during the poll sequence. At power-up time, the Control processor 150 interrogates all of the possible address values to determine the poll sequence. The Control processor 150 may alter the board address dynamically to conform to a sequential poll. A board is deselected from the system by excluding its address from the poll.

Hardware

Some consideration should be given to the hardware requirements of the system. Since it is a multi-processor 400 system to be used in a mobile environment, it is recommended that low power microprocessors 400 be used and internally "bus" oriented systems be avoided. This limits the design to single-chip CMOS processors with today's technology.

The Bus interface circuit 400 should be designed for fail-soft and not load the Bus 230 if a local failure occurs. The system may continue to function, for example, if one of the Local processors 110 fail.

The D/A interface used with the volume and squelch (and power level) functions should be standard from radio to radio so that the same data word will cause the same output level.

The display 160 and keyboard 170 functions of the Control processor 150 should be stand-alone systems so that the Control processor 150 is not burdened by display refresh or keyboard scanning, etc.

The radio package 120, 140 and 200 should provide power switching capability if the standby function is to be used.

The Bus receiver interface circuit 400 should provide sufficient gain to compensate for voltage offsets but not too much gain to cause noise when no signal is present. This may cause unnecessary falsing in the system.

Any external control elements of the processor systems should be "latched" so that the primary task is monitoring the serial Bus 230 for data. The acknowledge function will allow certain tasks to miss the poll address. However, the number of retransmissions are limited and should be considered in the design.

The Bus receiver logic of all processors will employ PLL clock recovery techniques to provide mid-bit sampling of the data. This clock is also used for asserting data on the Bus and care should be taken to provide "smooth" bit transitions without "glitches." Also, the Bus data is baseband requiring proper phasing of the receiver.

Mechanics

The mechanics of the Control processor system 150 (i.e., the control head) will be intimately related to the electronics. The package should be as small as possible with enough room to accommodate the display 160 and keyboard 170. The Bus 230 interconnect scheme should allow for expansion with Local processors 110 that are external 180 to the radio 120, 140 and 200. A significant amount of styling is required.

Thus, there has been provided a reliable, internally, register-modelled, addressable, internally, serially-bussed mobile radio architecture with logical, human engineered control and operator validation feedback.

Further, there has been provided a reliable, internally, register-modelled, addressable, internally, serially-bussed mobile radio architecture with logical, human engineered control and operator validation feedback that:

provides an incredibly flexibly architected radio structure;

distributes the command and control processing among various radio subsystems, providing them with a greater degree of flexibility and autonomy;

provides simple and reliable cabling interconnections between radio peripheral components;

employs a "smart" control head that may be multiplexed with each functional subsystem to facilitate operator input, output and feedback required for the command and control of each subsystem;

provides a radiosystem capable of having a multiplicity of various radios, functions, features and enhancements in a single, mobile system without unnecessary redundancy of control heads and functional subsystems; and provides logical, human engineered system control and operator validation feedback.

It will be appreciated by those skilled in the art that this register-modelled invention may be practiced by making design tradeoffs between the complexity and simplicity of the operation code set and the register modelling. The register set can be virtually eliminated, as such, and simulated in software variables with an extensive and particularized operation code set—much larger and richer than the read, write and acknowledge set a of primitives discussed above. However, some of the I/O independence is lost through this compromised, but expedient approach.

For example, rather than simply writing data to be displayed into a register as a data argument to a write op-code, a new op-code, defined as write-to-display could be defined with a data argument that would simulate the same function. However, some of the I/O independence is lost because the new write-to-display op-code is not an op-code that is generic to the entire system, but only has meaning to a display device. Thus, there is a design tradeoff between simplicity and primitiveness of the operations codes or complexity and richness and I/O independence. But, in either case, the objects of the present invention are met.

An intermediate approach is described in Appendix I that uses the primitive set of op-codes, namely: reset, read, write, bit clear, bit set, acknowledge and negative acknowledge, but then adds more, yet somewhat generic op-codes, namely: request display, show display, short register is, long register is, name is, and display is for commonly used display and status functions, and read a short register, read a long register, write to a short register, write to a long register, update a short register, update a long register, similar to multiple precision numbers, in order to more efficiently handle multibyte strings. In this type of register-modelling, registers are used as virtual representations of a physical device, only at a more fundamental level. The register models a physical component (e.g., the display) rather than the entire peripheral device (e.g., the control head). However, the underlying concept is the same.

An even greater tradeoff is presented in Appendix II. The primitive set of operation codes is splintered into a rich variety of nearly discrete op-codes that implement functions very closely associated with the physical device itself.

It will be appreciated by those skilled in the art that the foregoing description of the various embodiments are merely illustrative of the broad inventing concept comprehended by the invention and has been given for clarity of understanding by way of unrestricted example. However, it is not intended to cover all changes and modifications which do not constitute departures from the spirit and scope of the invention.

APPENDIX I

1.0 INTRODUCTION

1.1 Purpose

The purpose of this document is to define the complete specifications for LONGHORN, the Systems 90 Replacement. LONGHORN is a microprocessor based radio control system which will replace the current Systems 90 control system in future mid and high tier mobile radios. By utilizing the lessons learned from Systems 90 and defining a more general purpose expansion package, future radios and options will be able to effectively interface with each other. The flexibility thus achieved will provide compatibility and cost effective solutions to radio expansion for Motorola's customers.

1.2 General Description

LONGHORN is based on a multi-processor network which allows easy expansion (a new option is simply plugged in without any rewiring), flexibility (for future option capability), and programmability (users can configure their own system). The system utilizes three basic components: a radio, a control head, and the options. These are connected together by control cable. Communication between these parts occurs using serial data on the data BUS. The radio has all operator and accessory selectable controls accessible via the serial BUS thus guaranteeing flexibility for future expansions.

The entire radio control system is modeled as a set of 8 bit registers. The systm allows for 256 registers of which only a fraction are actually implemented. These registers physically reside in the radio and control head and can be manipulated by the options to get their particular task completed. Access to these registers are obtained by using techniques similar to CSMA/CD (carrier sense, multiple access with collision detection).

A key component of the full capability LONGHORN system is the Systems Control Head display and keypad. The display is a 2 line×40 character, 5×7 dot matrix LCD. Above and below the display are a series of 8 unlabeled buttons (16 total). The button functions are defined according to what is currently written on the display. Thus as different options are accessed, the same buttons mean different things. The ability of the options to redefine the display not only minimizes the space used on the dashboard (additional options don't require more buttons) but also allows the options to be physically located anywhere. The 2 line×40 character, 5×7 display format allows a vast amount of information to be presented to the operator (e.g. each frequency can now be given a name). Effective utilization is limited only by the imagination of the option designer.

2.0 CONTROL CABLE

The term control cable refers to the entire cable connecting the radio, options, and control head together. It includes 3 power lines (not including the big RED, big BLACK, ORG and GRN leads), 2 speaker lines, 1 shielded low level audio line, 3 digital lines, and a digital shielded twisted pair. These 13 lines (excluding 2 shields) are routed throughout the system allowing access for all options. The speaker and power lines will handle 3 amps and the rest can handle 0.5 amps. The fully expanded control cable will be similar to the standard cable but also contains 3 more shielded audio lines (TXAUD, RXAUD, and DISC). Multi-radio systems also require that CH ACT (channel activity) be part of the cable and will be optionally available.

2.1 Power Routing

Options have available B+, B−, and SWB+ on the cable kit. This gives them the capability to keep powered up by using B+ as the positive supply instead of SWB+ (which can then be read by these options). This may also be used to keep standby RAM powered up. All options must minimize power consumption if operated in this mode.

Another use of these lines allows options to keep the entire system powered up regardless of the on/off switch (such as AVL). This is done by having the option use an on-board relay to short B+ and SWB+ together. This is done at power on. If the power switch is subsequently turned off, the relay will keep the system up.

For each system, a user needs to purchase a positive or negative ground cable kit. The radio, control head, and options can be used without modification in either system. The connectors at each end of the cable kit contain jumpers which 'program' the radio and control head to the proper system. If a positive ground cable is put into a negative ground installation, the fuses in the red and green leads will blow. In a positive ground system, A+ and B+ are connected at the radio connector while A− and B− are connected at the control head connector (negative ground systems are the reverse). In all instances '+' refers to the more positive voltage (which turns out to be the chassis in positive ground installations). The on/off switch does not switch the HOT side of the battery, but always switches B+. One consequence to this type of power switching in positive ground installations is that if the system is switched off while the GRN fuse is blown, then anything getting power from SWB+ (the majority of options) will have both supply terminals floating. This is not considered to be a problem.

2.2 Audio Lines

The 4 audio lines include a MIC line, a DISC line and two general purpose lines: TXAUD and RXAUD. These last two lines can be configured as inputs to various points in the radio as described in section 5.2.1. The audio level of the MIC line is approximately 80 mv for 3 kHz deviation while the DISC line is approximately 500 mv for full rated audio. The TXAUD and RXAUD lines are typically 1 ma rms (for 3k deviation or to match the discriminator level which provides full rated audio). The signals on these lines are currents to allow the options to easily sum their outputs. The TXAUD and RXAUD lines are actually summing junction nodes. Each option is connected to these lines and is responsible for keeping the line unloaded and free from extraneous signals when not in use (1 ua of noise corresponds to a S/N of 60 dB). The DISC, TXAUD, and RXAUD lines are only available on the fully expanded control cable.

2.3 Data Bus

The data BUS actually consists of two types of signals. One is called the BUS and contains the actual data being sent. The others are collectively called the BUSY lines and indicate when data is on the BUS. The signals on both types of lines are inverted from that presented to the microcomputers on the PC boards.

The BUS is a balanced, twisted shielded pair. A '1' is represented by V+<V− −0.2 v and a '0' by V+>V− +0.2 v. These lines should be driven by an RS422 driver such as the SN75176 by Texas Instruments. Pertinent parameters are:

BUS DRIVERS
   Vol<1.2 v @ 33 ma
   Voh>3.5 v @ 33 ma
     Iout(max) >50 ma @ Vout=1.2 v, 3.5 v
   tr, tf<0.1 bit time @ 100 ohms BUS RECEIVERS
    Va-Vb >0.2 v @ −7 v<Va, Vb<12 v
    Iin(max) <1 ma @ −7 v<Va, Vb<12 v
   tr, tf<1 usec The BUSY lines are used to indicate when data is on the BUS. Since the messages have a variable length, it is possible that errors may cause options to get 'out of sync' with each other. The BUSY lines are also used to minimize this since it indicates when the start and end of a transaction take place (see section 3.9). Two lines are needed to control contention between options inside the radio and those outside. One is called CH BUSY (Control Head BUSY) and the other is called RA BUSY (RAdio BUSY). The use of these lines are discussed in section 3.2.

3.0 BUS PROTOCOL

3.1 Signaling Definition 3.1.1 Data Packet, Messages, Transactions

The basic building block upon which the serial BUS is built is the 8 bit data packet. This is sent in the normal fashion with a start bit, 8 bits of data (LSB first), and a single stop bit. These are concatenated to form a single 'message' (a series of packets sent from a single source to a single destination). Each message consists of an opcode packet, a variable number of information packets, and a CRC packet. The opcodes and the required number of information packets are described in section 3.6. The CRC is described in section 3.1.2. Several messages may transpire before a 'transaction' is complete. Each message must be followed by a response, either the data requested by the message or an Acknowledge (ACK). A Negative Acknowledge (NAK) may also be sent if the received message cannot be performed due to an invalid opcode. If the received message has errors, no response will be made.

3.1.2 CRC

The CRC is a shortened (63,56) code and is appended to each message for error detection. When used with messages of 56 bits (7 packets) or less, the minimum distance is 4 (e.g. it will detect the presence of 1, 2, 3, and 4 bit errors).

To form the CRC, intialize all stages to zero, shift in the data (LSB first), then shift out the parity bits (MSB first). These then get appended to the data. Upon reception, if the locally calculated CRC does not match the received CRC, then an error has occurred. Since, a whole packet is reserved for the CRC, bit 7 can be used as an additional check and will always be sent as a zero.

Typically, after each packet is received, a partial CRC should be calculated. After the last packet, the result should equal 0. This is because the last packet was actually the transmitted CRC. If the locally generated CRC equalled the transmitted CRC, then the result of performing the exclusive-OR's will be zero. This makes it very convenient for the receivers to determine if the message contained errors or not.

See section 3.9 for a discussion on error handling.

3.2 BUSY

The BUSY lines serve to indicate when a message exists on the BUS and is controlled by the device originating the message. This helps options to tell which part of the transaction they are currently looking at. A falling edge on either BUSY line indicates that the first opcode of a transaction is about to follow. A rising edge indicates that the last packet on the BUS was the CRC of the response.

The BUSY lines are normally high when the BUS is not busy. Before an originated message can be sent on the BUS, both BUSY lines must be checked to make sure they are both high (responses will be sent regardless of the state of the BUSY line). If so, the message originator can send data on the BUS. It is held low for as long as the originator needs to use the BUS. BUSY is released (goes high) after the originator has accepted the response to its last message. These bi-directional lines are pulled up and can be "wire-or'd".

3.2.1 Radio Busy

This line is also called RA BUSY and is used by all options (and radio) which reside in the radio. It is envisioned that the line is pulled up by a resistor and all microprocessor ports are directly tied together. To read the line, the ports are inputs. To control the line, the ports pull low. There will therefore be no port contention. To originate a message on the BUS, an option must first check to see that both BUSY lines are high. If so, it pulls RA BUSY low and is free to use the BUS.

3.2.2 Control Head Busy

There exists a substantial delay along a 22' cable from the radio to the control head. When RA BUSY is pulled low, the control head won't be able to tell until this time delay has passed. Thus the chance for collisions between the control head and options in the radio has dramatically increased. To alleviate this problem, a second 'busy' line has been added and is called CH BUSY. For the control head (and any external option) to use the BUS, it must first check to see if both BUSY lines are high. If so, it then pulls CH BUSY low and waits. Two cable delays later, if RA BUSY is still high, it is then free to use the BUS. This gives the options in the radio time to tell if the control head wishes to use the BUS.

*****Note: The need for the CH BUSY line is dependent on whether a collision can be detected across 22' of cable. This, and the definition of 'cable delay', are subject to further investigation.

3.3 Timing

Options use the BUS based on CSMA/CD techniques. That is, whenever they wish to use the BUS, they can use it if it is free; if it is busy, then they must wait until it is free. The timing overhead for this type of BUS access is minimal. The only timing restriction between the BUS and RA BUSY is that RA BUSY must be pulled low *before* the start of the data and released *after* the response to the last message. There is no limit to the length of time that BUSY may be held low. There is no limit to the time between concatenated message packets. However, there is a time limit between the end of a message and the start of the response. If a response isn't started within 1 packet time, the message will be retransmitted (see section 3.9). Although, the LONGHORN BUS protocol places very little demand on the option's timing, it is recommended that options be designed to minimize BUS usage in order to improve access time for other options. Also the time between BUSY check and pulling BUSY low should be minimized to avoid collisions.

Before an external option (or control head) can originate a message on the BUS, it must check RA BUSY and CH BUSY and if free, it must wait 2 cable delays (TBD). It then checks RA BUSY again and if free, it can use the BUS.

If a collision is detected (see section 3.9), the option must immediately release BUSY and wait before starting the message over again. This wait time is dependent on the option's address and will be detailed in future issues of this document.

3.4 Option Addresses

LONGHORN will allow up to 30 addressable options. All options, control heads, and radios should be assigned different addresses. Some options may have (but do not require) more than one address if they have more than one display (such as the MSG and STAT displays of an MDC600 option). Some addresses won't have any display (such as EMERGENCY). Thus the fact that 30 addresses are available does not necessarily mean that 30 physical option boards are allowable or that 30 buttons are needed in order to access each one. Options are given addresses ranging from address 2 thru 31 (inclusive). Address 1 is reserved to refer to the radio while address 0 is reserved to refer a high priority option (see section 6.2.1). Option addresses are used by the control head to allow options to share VIP outputs, assign buttons on the MENU page, determine whose annunciator to turn on, and to determine whose display is currently being shown. Addresses are also used by the radio to implement the OPTION STATUS registers (see section 3.5).

On power up, the control head gets informed about the existence of occupied addresses. If an address is occupied it can be given a button on the menu page for selection by the operator. An option can be given more than one button on the menu page only if it occupies more than one address.

3.5 Register Set

Actions are accomplished by manipulating bits in the LONGHORN register set. LONGHORN allows 256 registers of which only some are reserved by the system. These are defined in the following pages. Some registers are read only. A write to these registers will not change the contents. Other registers are write only. A read of these registers will return unknown results. Each register belongs to a 32 register set which are listed below:

| ADDRESS | REGISTER |
|---------|----------|
| $00–$1F | CONTROL HEAD register set |
| $20–$3F | RADIO register set |
| $40–$5F | VIP MAP register set |
| $60–$7F | OPTION STATUS register set |
| $80–$9F | not used by LONGHORN |
| $A0–$BF | not used by LONGHORN |
| $C0–$DF | not used by LONGHORN |
| $E0–$FF | not used by LONGHORN |

The unused registers can be reserved for use by multi-board options to allow them to talk to each other. An example might be a telephone interconnect with a 3×4 keypad/handset at the front of the car and the microcomputer which actually implements the option's function in the radio. To read the handset buttons, the option just needs to read register N where register N is one of the registers not used by LONGHORN but resides in the handset. Other options may also utilize register N if they desire 3×4 keypad use. Register N could also be reserved by another completely unrelated option as long as the two will never be used in the same system (unless one is read-only and the other is write-only).

3.5.1

| CH STATUS Register Reg Address: $00 | 7 | 6 | 5 | 4 | 3 | 2 | 1 | 0 |
|---|---|---|---|---|---|---|---|---|
| | PRI | — | — | — | — | IGN SW | ON SW | OFF HUB |

PRI = 1 to indicate the control head is primary
IGN SW = 1 whenever the ignition switch is on
ON SW = 1 whenever the power switch is on
OFF HUB = 1 whenever the microphone is out of the hang up clip This register contains the state of the various switches normally located at the control head and is implemented by the control head. The entire register is updated approximately every 5 msec. Whenever any of these bits change state, the entire register along with the DISPLAY register is put on the BUS using the UPDATE REG LONG opcode. This register is read only except for PRI which is read/write.

PRI will always be equal to '1' by definition (see section 4.5). It merely exists to allow secondary control heads to become primary. This is done by the secondary writing a '0' into PRI. At this point the primary and secondary reverse roles. The new primary would then implement the CONTROL HEAD register set (with PRI=1).

On power up, the entire register is set to reflect the present status of the switches.

3.5.2

| DISPLAY Register Reg Address: $01 | 7 | 6 | 5 | 4 | 3 | 2 | 1 | 0 |
|---|---|---|---|---|---|---|---|---|
| | BUT PRS | SCR BUT | DIS TYP | DISPLAY ADDRESS | | | | |

BUT PRS = 1 whenever a button is depressed on the keypad (except for the 'MENU' button)
SCR BUT = 1 whenever the button being pressed is in the 'scroll' mode (see below)
DIS TYP = 0 to indicate a programmable ASCII display
 = 1 to indicate a dedicated display
DISPLAY ADDRESS contains the address of the option which currently has its display showing. Address 0 corresponds to the MENU page and address 1 corresponds to the HOME page.

This read-only register contains the status of the current display and is implemented by the control head.

When any bit changes, the entire register and the BUTTON register are put on the BUS using the UPDATE REG LONG opcode.

The BUT PRS and BUT SCR bits are used to inform an option that a button is pressed. The operation of these bits are as follows:

(1) an operator depresses a button, BUT PRS is set to 1 and an UPDATE REG LONG is sent (2) if the button is released within 0.5 sec, BUT PRS is set to 0 and an additional UPDATE REG LONG opcode is *not* sent (3) if the button is held, SCR BUT is also set to 1 and an UPDATE REG LONG opcode is sent approximately every 53 msec until the button is released (4) when the button is released after scrolling, both BUT PRS and SCR BUT are set to 0 and an UPDATE REG LONG *is* sent The DIS TYP bit allows options to read buttons on either type of display. Options must utilize an internal lookup table to interpret buttons on either type of display if they are to be operable with either type of display.

The DISPLAY ADDRESS informs the options whose display the button was pressed on.

On power up, the entire register is set to 0 except for DIS TYP which is set according to the type of display resident at the control head.

*****NOTE: The current concept of display and button handling is being reviewed and will be updated in future issues of the document.

3.5.3

| | 7 6 5 4 | 3 2 1 0 |
|---|---|---|
| BUTTON Register<br>Reg Address: $02 | 2nd BUTTON<br>ADDRESS | 1st BUTTON<br>ADDRESS |

BUTTON ADDRESS contains the address of the last button pressed. Button addresses are 0 to 7 from left to right on the top, and 8 to $F from left to right on the bottom.

This register contains the address of the last button pressed on the keypad and is implemented by the control head. Up to 2 simultaneously pressed buttons can be utilized. When only 1 button is pressed, the 2nd button address is set equal to the 1st button address. This register is read only and is updated each time a button is pressed. Whenever a button is pressed, both this register and the DISPLAY register are put on the BUS using the UPDATE REG LONG opcode.

On power up, both addresses are set to 7.

*****NOTE: The current concept of display and button handling is being reviewed and will be updated in future issues of the document.

3.5.4

| | 7 6 5 4 3 2 1 0 |
|---|---|
| 2nd VOLUME Register<br>Reg Address: $04–$07 | – \| VOLUME |

VOLUME = 0 for minimum volume
= $7F for maximum volume

The SECONDARY VOLUME register contains the current volume setting for the local audio amplifier and is used for multicontrol head applications. This register resides in the EMS option box and is a read/write register (see section 4.5).

On power up it is set to the last value stored in the EEPROM.

3.5.5

| | 7 | 6 5 | 4 3 2 1 0 |
|---|---|---|---|
| ANNUNCIATOR Register<br>Reg Address: $0F | ANN<br>EN | — — | OPTION<br>ADDRESS |

ANN EN = 0 to turn off the annunciator
= 1 to turn on the annunciator
OPTION ADDRESS contains the address of the option requesting the change in annunciator status. Only the annunciator of the specified address will change.

This register is implemented only control heads which have ASCII displays and is write only.

This register allows options to attract the attention of the operator even when that option's display is not currently being shown. When an option's annunciator is enabled, the 'HOME' button is blinked when another option's display is showing (or the 'MENU' button is blinked when the HOME page is showing). When the 'HOME' button is pressed, the 'MENU' button is blinked. When the 'MENU' button is pressed, the MENU page is shown with the appropriate option(s) name blinking. Thus, the operator is guided from one display to another. Any number of options can have their annunciator enabled at any one time.

On power up, all annunciators are turned off.

*****NOTE: The current concept of display and button handling is being reviewed and will be updated in future issues of the document.

3.5.6

| | 7 | 6 5 4 3 2 1 0 |
|---|---|---|
| VIP INPUT Register<br>Reg Address: $10–$13 | VIP<br>IN | — — — — — — — |

VIP IN = 0 when a high voltage exists on the pin
= 1 when a low voltage exists on the pin This register set occupies 4 register addresses, one for each VIP input pin (see section 4.2.1). Register $10 is for IN1, $11 is for IN2, $12 is for IN3, and $13 is for IN4. These registers are read only. Whenever a bit changes in these registers, they are put on the BUS using the UPDATE REG SHORT opcode. Each VIP input pin (and corresponding VIP INPUT register) is implemented by only one control head as determined by that control head's OPTION STATUS register. The 4 VIP input pins can be dedicated to only one control head or spread out among the maximum of 4 control heads.

On power up, these registers are set to reflect the voltage present on these pins. See section 4.2.1 for voltage level definitions. Also see section 3.5.42 for further discussions on the VIP.

3.6.7

| | 7 | 6 5 | 4 3 2 1 0 |
|---|---|---|---|
| VIP OUTPUT Register<br>Reg Address: $14–$17 | VIP<br>OUT | — — | OPTION<br>ADDRESS |

VIP OUT = 0 to turn off (output voltage high) the output
= 1 to turn on (output voltage low) the output
OPTION ADDRESS contains the address of the option requesting the change in the output pin.

The VIP OUPUT register set occupies 4 register addresses, one for each VIP output pin (see section 4.2.1). Register address $14 is for OUT1, $15 is for OUT2, $16 is for OUT3, and $17 is for OUT4. A write to these registers will force the appropriate VIP output pin to the desired state. Options are required to specify their address when writing to this register to allow the control head to determine who has which pin pulled low. The control head then performs a 'wired OR' function on each pin. If any option wants a VIP output pin pulled low (by writing a 1 into the VIP OUT bit), the output will go low. Only when all options want the output to go high (by writing a 0 into the VIP OUT bit) will it actually go high. This allows several options to share a pin without interference.

These registers are write only. All control heads will respond to a write to these registers, but only the control head with a device plugged into its VIP will have any effect. On power up, all VIP output pins are off (voltage is high).

3.5.8

| 7 | 6 | 5 | 4 | 3 | 2 | 1 | 0 |
|---|---|---|---|---|---|---|---|
| RDY | R/W | EEPROM ADDRESS (MSB) | | | | | |

EEPROM ADDRESS register
Address: $1D 3.5.9

| 7 | 6 | 5 | 4 | 3 | 2 | 1 | 0 |
|---|---|---|---|---|---|---|---|
| EEPROM ADDRESS (LSB) | | | | | | | |

EEPROM ADDRESS register
Address: $1E 3.5.10

| 7 | 6 | 5 | 4 | 3 | 2 | 1 | 0 |
|---|---|---|---|---|---|---|---|
| EEPROM DATA | | | | | | | |

EEPROM DATA register
Address: $1F

EEPROM DATA contains the data to be written to or read from the EEPROM at the specified address.
EEPROM ADDRESS contains the location in the EEPROM where data is to be written or read.
R/W = 0 to write to the EEPROM
    = 1 to read from the EEPROM
RDY = 0 when the EEPROM is busy saving data
    = 1 when the EEPROM is ready to accept new data These registers provide for the capability to change up to 16k of memory directly from the BUS. Although only 2k (and optionally 4k) of EEPROM will be initially available with the low band SYNTOR X, the remainder will be useful for modifying expanded scan lists, program 'ROM' in the radio and control head microcomputers, and EEPROM located on the option boards.

To read EEPROM contents, options must first check to see that RDY=1 (i.e. it is ready). If not, then the EEPROM is busy storing (this can take up to 10 msec/byte). If the EEPROM is ready, then the option writes into the EEPROM ADDRESS registers, setting R/W=1. The option then reads the EEPROM DATA register. The EEPROM DATA register is updated each time the EEPROM ADDRESS register is written to. If RDY=0, the EEPROM DATA register may contain invalid data.

To write into the EEPROM, options must again check to see if RDY=1. If ready, the option first writes the data into the EEPROM DATA register and then into the EEPROM ADDRESS register, setting R/W=0. RDY will then go low. When done, the radio will set RDY=1 and R/W=1. The EEPROM has latched address and data lines. Thus, only the address and data which exist when RDY=1 and R/W goes from 1 to 0 will be used to update the EEPROM. At all other times, options can still change these registers but the EEPROM will not be affected.

These registers are read/write except for the RDY bit which is read only. On power up the address and data are initialized to 0 while the RDY and R/W bits are set to 1.

3.5.11
RECEIVE ROUTING register
Address: $20

| 7 | 6 | 5 | 4 | 3 | 2 | 1 | 0 |
|---|---|---|---|---|---|---|---|
| — | — | DET EN | | ALERT TONE | | RXAUD ROUTING | |

DET EN = 00,01,10 to disconnect the discriminator
= 11 to allow the squelch detect logic to unmute the discriminator
ALERT TONE = 00 to turn off tones
= 01 to turn on a .25 sec tone. The radio will reset ALERT TONE to 0 when done.
= 10 to turn on a continuous tone
= 11 to turn on a continuous tone pulsed at a 2Hz rate at 50% duty cycle
RXAUD ROUTING = 00 to disconnect the RXAUD line
= 01 to connect to audio shaping circuitry
= 10 to connect to attenuator input
= 11 reserved This register allows options to manipulate the receive audio path from the discriminator to the speaker. It is implemented by the radio and is a read/write register. On power up, this register is set to $30.

RXAUD ROUTING should be written to only when it is currently disconnected (00) to keep options from interfering with each other. LONGHORN does not check for violations of this. See section 2.2 for a description of the audio lines.

The alert tone frequency is approximately 800 Hz. The radio has priority when using the alert tone for internal functions such as TOT or audio feedback for button pressing. When done with the alert tone, it will revert to the mode indicated in the register (the contents of the register will not change when the radio is using the alert tone). When busy, ALERT TONE should not be written to or improper operation may result. The radio will place the entire register on the BUS using the UPDATE REG SHORT opcode whenever the radio changes ALERT TONE from 01 to 00.

The DET EN bits are internally ANDed together to determine discriminator muting. This allows several options to keep the discrimintor muted without interference. Up to 3 options may simultaneously keep the radio muted by each one decrementing DET EN. Once 00 is reached, it should not be decremented further. If a fourth option wishes to mute the discriminator, it must wait for one of the other options to get done (signified by DET EN being incremented to 01). When done muting the discriminator, options should increment DET EN. As soon as DET EN=11, all 3 options are done and no further incrementing should take place. LONGHORN does not check for violations of this recommended procedure.

3.5.12

RECEIVE STATUS register
Address: $21

| 7 | 6 | 5 | 4 | 3 | 2 | 1 | 0 |
|---|---|---|---|---|---|---|---|
| CHN ACT | EXT | — | RPL EN | UNM TYP | MUT TYP | PL DET | SQ DET |

| | |
|---|---|
| CHN ACT | =1 when the short time constant carrier is present |
| EXT | =1 to turn on the noise blanker |
| RPL EN | =0 to disable the coded squelch decoder |
| | =1 to turn on the coded squelch decoder |
| UNMUT TYP | =0 to select PCI unmuting |
| | =1 to select AND unmuting |
| MUT TYP | =0 to select PCI muting |
| | =1 to select OR muting |
| PL DET | =1 when coded squelch is present |
| SQ DET | =1 when the long time constant carrier is present |

This register allows options to read and/or modify receiver operation and is implemented by the radio. All of the bits are read/write except for CHN ACT, PL DET, and SQ DET which are read only. On power up, the register contents will be dependent on the mode description in the EEPROM.

The entire register is put on the BUS using the UPDATE REG SHORT opcode whenever PL DET and SQ DET change. This does not occur with CHN ACT since it changes too rapidly.

RPL EN implements the inverse of the MONITOR function and causes the radio to reflect this change on the HOME page.

For a detailed description of PCI, OR, and AND muting and unmuting, see section 5.3.

3.5.13

TRANSMIT STATUS register
Address: $22

| 7 | 6 | 5 | 4 | 3 | 2 | 1 | 0 |
|---|---|---|---|---|---|---|---|
| PTT EN | RPT | TPL EN | RB EN | TX POWER | | TX LIT | RAD KEY |

| | |
|---|---|
| PTT EN | =1 to enable PTT to key the transmitter |
| RPT | =1 to enable talkaround mode list |
| TPL EN | =1 to enable the coded squelch encoder |
| RB EN | =1 to enable the reverse burst encoder. TPL EN must also be 1 before reverse burst will be sent. |
| TX POWER | =00 for lowest transmitter power |
| | =01 for medium low power |
| | =10 for medium high power |
| | =11 for highest transmitter power |
| TX LIT | =1 to enable the transmit indicator |
| RAD KEY | =1 when the radio turns on its RF transmitter |

This register allows options to read and/or modify transmitter operation. All bits are read/write except for RAD KEY which is read only. This register is implemented by the radio and powers up with RAD KEY=0, PTT EN=1, and TX LIT=1. All remaining bits are dependent on the mode description in the EEPROM.

All enable bits are operable only during transmission (e.g. setting TX LIT turns on the transmit indicator only when the radio is keyed). The absolute power levels obtainable with TX POWER are entirely dependent on the radio. Whenever the RAD KEY bit changes state, the entire register and the TRANSMIT ROUTING register are put on the BUS using the UPDATE REG LONG opcode. For a detailed discussion on transmit logic and timing, see sections 3.8 and 5.4.

Whenever the radio transmits, it puts itself into the mode defined by this register (see section 3.8).

3.5.14

-continued

TRANSMIT ROUTING register
Address: $23

| 7 | 6 | 5 | 4 | 3 | 2 | 1 | 0 |
|---|---|---|---|---|---|---|---|
| MIC MUT | — | TX AUD PRIORTY | | TX SUB PRIORTY | | TXAUD ROUTING | |

| | |
|---|---|
| MIC MUT | =1 to disconnect the microphone |
| TXAUD PRIORITY | =00 for lowest audio band priority |
| | =01 for next highest priority |
| | =10 for next highest priority |
| | =11 for highest audio band priority |
| TXSUB PRIORITY | =00 for lowest sub-audio band priority |
| | =01 for next highest priority |
| | =10 for next highest priority |
| | =11 for highest sub-audio band priority |
| TXAUD ROUTING | =00 to disconnect the TXAUD line |
| | =01 to connect to the splatter filter |
| | =10 to connect to the buffer input |
| | =11 reserved |

This register is a read/write register and is implemented by the radio. It allows options to manipulate the transmit audio path from the microphone to the modulator input. This register powers up with all bits equal to 0.

When using the TXAUD line, options need to assign their priority to the line. Options of lower priority should not use the line while options of higher priority can feel free to reconfigure it. Violations of this procedure are not prevented by LONGHORN. The MIC MUT line is controlled by the option with the highest TXAUD priority. For a detailed discussion on audio routing and priorities see sections 2.2 and 5.2.1.

Whenever the radio transmits, it puts itself into the mode defined by this register (see section 3.8).

3.5.15

TRANSMIT register
Address: $24

| 7 | 6 | 5 | 4 | 3 | 2 | 1 | 0 |
|---|---|---|---|---|---|---|---|
| TX ON | — | — | OPTION ADDRESS | | | | |

TX ON =1 to turn on the radio transmitter
OPTION ADDRESS contains the address of the option turning on the transmitter.

This register allows any number of options to key the radio without interfering with each other. To key the radio, options must write to this register, setting TX ON=1 and supplying their address. To de-key the radio, options must write to this register setting TX ON=0 and supplying their address. All of the TX ON bits are internally OR'd together. Only when all options desire to de-key the radio will it actually do so (exception: TOT).

This register is used to initiate option-originated transmissions. Operator-originated transmissions are initiated by the PTT line on the cable. TX ON should not be set during a PTT originated transmission unless it is desired that the radio keep transmitting when PTT is released.

This register is write only and is implemented by the radio. On power up, all TX ON bits are cleared. They are also automatically cleared when the radio dekeys due to TOT. For a detailed discussion on how this bit is used, see section 3.9.

3.5.16

```
                  7   6  5  4  3  2  1  0
TOT register     |TOT |   TIME OUT TIMER  |
Address: $25     |EN  |                   |
```

TOT EN = 1 to enable the time out timer
TIME OUT TIMER contains the number of 15 sec (+/− 10%) counts. A value of 0 represents a count of 128.

This read/write register gives options the ability to modify time out timer operation. It is implemented in the radio and powers up with a value determined by the mode description in the EEPROM. A change made to the TOT value during a transmission when TOT EN=1 will have no effect until the start of the next transmission. When TOT EN goes from a 0 to a 1, the TOT value becomes immediately valid regardless of whether the transmission has already started or not.

Whenever the radio transmits, it puts itself into the mode defined by this register (see section 3.8).

3.5.17

```
                  7   6  5  4  3  2  1  0
VOLUME           |VOL |     VOLUME        |
register         |OVR |                   |
Address: $26
```

3.5.18

```
                  7   6  5  4  3  2  1  0
SQUELCH          | - | - | - | - | SQUELCH |
register
Address: $27
```

VOL OVR = 1 to indicate that the present volume level is temporary and that the previous value is to be restored when this bit is cleared.
VOLUME = $00 for minimum volume
       = $7F for maximum volume
SQUELCH = $0 for unsquelched
        = $9 for tight squelch These registers allow options to change the volume and squelch settings. These are read/write registers and are implemented by the radio. On power up, they are restored to the value they were last set to (exception: VOL OVR is cleared and VOLUME is restored to its steady state value).

3.5.19

```
                  7  6  5  4  3  2  1  0
MODE register    |     SELECTED MODE      |
Address: $28
```

3.5.20

```
                  7  6  5  4  3  2  1  0
MODE register    |     RECEIVED MODE      |
Address: $29
```

3.5.21

```
                  7  6  5  4  3  2  1  0
MODE register    |     TRANSMIT MODE      |
Address: $2A
```

SELECTED MODE contains the mode number selected by the operator
RECEIVED MODE contains the last received mode number
TRANSMIT MODE contains the mode number to be transmitted on These read/write registers allow options to read/modify the operating the RF frequency. They are implemented by the radio and on power up are all set to the last selected mode. SELECTED MODE changes each time the operator changes mode as determined by the radio. RECEIVED MODE may change each time SQ DET (register $21) goes high and may be different from SELECTED MODE due to channel scan. TRANSMIT MODE normally equals SELECTED MODE. It changes due to frequency steering and talk back scan operation. Whenever any of these registers change due to non-BUS activity (e.g., internal channel scan), it is put on the BUS using an UPDATE REG SHORT opcode.

Whenever the radio transmits, it puts itself into the mode defined by register $2A (see section 3.8).

3.5.22

```
                  7  6  5  4  3  2  1  0
PL/DPL register  |    RECEIVE PL/DPL CODE  |
Address: $2B
```

3.5.23

```
                  7  6  5  4  3  2  1  0
PL/DPL register  |   TRANSMIT PL/DPL CODE  |
Address: $2C
```

PL/DPL CODE = code number currently being executed

These read/write registers allow options to modify the current coded squelch. It is implemented by the radio and on power up gets reset to the value determined by the mode description in the EEPROM.

Whenever the radio transmits, it puts itself into the mode defined by register $2C (see section 3.8).

3.5.24
SCAN CONTROL register
Address: $2D

```
  7    6  5   4    3    2    1    0
|SCN | - | - |INT |SCN |TLK |PRIORTY |
|INH |   |   |    |    |BCK |ENABLES |
```

SCN INH  = 1 no scan is allowed on this mode
INT      = 0 if the scan list is not mode dependent
         = 1 if the scan list is mode dependent
SCN      = 1 to turn on the scan
TLK BCK  = 1 to turn on talk back scan capability
PRIORTY ENABLES = 00 to disable priority scanning
                = 01 to enable priority 1 scan
                = 10 to enable priority 2 scan
                = 11 to enable dual priority scan Although scan is actually an option, its operation is so intimate with the radio that it is given its own register set. This register is read/write (exception: SCN INH is read only) and resides in the radio. On power up, the bits are set to a value dependent on the mode description in the EEPROM.

The SCN INH and SCN bits are used by the radio to determine what to put on the ASCII display according to the following table:

| SCN INH | SCN | DISPLAY |
|---------|-----|---------|
| 0 | 0 | 'Scan Off' |
| 0 | 1 | 'Scan On' |
| 1 | 0 | none |
| 1 | 1 | none |

The INT bit instructs the radio to update the scan list as mode changes are made. If INT=0, then the scan list will not be updated.

3.5.25

SCAN PRIORITY register
Address: $2E

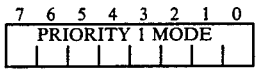

3.5.26

SCAN PRIORITY register
Address: $2F

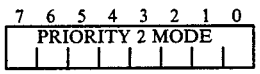

These read/write registers contain the mode numbers for the priority channels. They are implemented by the radio and are set according to the mode description in the EEPROM on power up and each time the mode changes (if INT=1 of register $2D).

3.5.27 thru 3.5.42

SCAN LIST registers
Addresses: $30–$3F

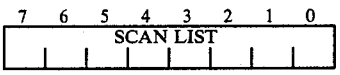

These 16 registers define the current scan list of up to 128 modes. Each bit is set to indicate that the mode is part of the scan list. Mode 1 occupies bit 0 of $30, mode 2 occupies bit 1 of $30, up to mode 128 which occupies bit 7 of $3F.

These read/write registers are implemented by the radio and are set according to the mode description in the EEPROM on power up and each time the mode changes (if INT=1 of register $2D).

3.5.43 thru 3.5.58

VIP MAP registers
Addresses: $40–$5F

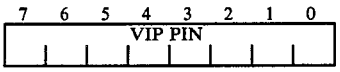

The contents of the 32 VIP MAP registers contain the locations of up to 32 devices on the VIP connector and are detailed below. If a device does not exist on the VIP (as determined by the EEPROM), then a value of 0 is placed in the register. The VIP MAP register set is implemented at the radio.

| VIP PIN | VIP MAP contents |
|---------|------------------|
| IN1 | $10 |
| IN2 | $11 |
| IN3 | $12 |
| IN4 | $13 |
| OUT1 | $14 |
| OUT2 | $15 |
| OUT3 | $16 |

| VIP PIN | VIP MAP contents |
|---------|------------------|
| OUT4 | $17 |

Up to 16 input type devices and 16 output type devices are supported by LONGHORN. The VIP MAP address for these are $40 thru $4F and $50 thru $5F, respectively. Currently defined I/O devices and their locations in the VIP MAP are:

| VIP MAP ADDRESS | I/O DEVICE |
|-----------------|------------|
| $40 | HORN RELAY |
| $41 | LIGHT RELAY |
| $50 | EMERGENCY SWITCH |
| $51 | HORN RING |

An example will illustrate how these registers are used. Suppose an option requires the use of the Emergency Switch. It first must find the pin it is connected to. This is accomplished by looking at address $50 in the VIP MAP register. This contains the number $12 which tells the option that the Emergency Switch is connected to pin IN3 of the VIP connector.

See section 4.1.1 for locations of the pins on the VIP connector and section 4.2.1 for details on voltage definitions.

3.5.59 thru 3.5.74

OPTION STATUS registers
Address: $60–$7F

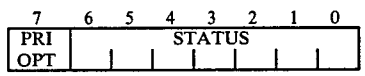

PRI OPT =1 if the option has high priority. It can use register $60 to see what the high priority status is.
STATUS contains option dependent information which is used to restore options to the state they were in before power was last removed.

Each option has one byte of EEPROM storage available to it located at the address which equals its address +$60 (eg. option 5 uses register $65). Typically these will be used to store their last known mode of operation which is to be recovered when power is returned to the system (see section 6.2.3). The radio can use register $61 and the status of the high priority option is contained in register $60. This read/write register is implemented by the radio. Control heads must reserve 4 bits to define the control head where each VIP input pin is connected (see section 4.2.1).

3.6 Opcodes

Opcodes ae used to instruct options, the control head, or the radio to perform certain actions or how to interpret following data. An opcode is the first byte of a message.

RESET—$xx from: any to: any
This is sent to start the power up sequence (see section 3.7) and does not require a response.

RQ DISPLAY—$xx from: Radio/options to: Control Head
This is sent to inform the Control Head that an option has a display to be shown and can be used to allow options to have their display shown without operator assistance (ie. no button had to have been pressed). A 2nd packet contains the address of the option making the request. The required response is SHOW DISPLAY.

*****NOTE: The current concept of display and button handling is being reviewed and will be updated in future issues of the document.

SHOW DISPLAY—$xx from: Control Head to: Radio/options

This is normally sent in response to the operator selecting an option on the MENU page but is also a response to the RQ DISPLAY opcode. A 2nd packet contains the address of the desired option. The required response is the DISPLAY IS opcode.

*****NOTE: The current concept of display and button handling is being reviewed and will be updated in future issues of the document.

READ REG SHORT—$xx from: Control Head/Option to: any

This is used to get information about the radio system by reading one of the registers in the LONGHORN register set (see section 3.5). A 2nd packet contains the address of the register of interest. Response is the REG SHORT IS opcode.

READ REG LONG—$xx from: Control Head/Option to: any

This is the same as above except that the 2nd packet contains the address of the first of 2 consecutive registers to be read. The required response is REG LONG IS.

WRITE REG SHORT—$xx from: Control Head/Option to: any

This allows options to modify the radio system by changing one of the registers in the LONGHORN register set (see section 3.5). A 2nd packet contains the address of the register of interest while a 3rd packet contains the data to be written. The required response is ACK.

WRITE REG LONG—$xx from: Control Head/Option to: any

This is the same as above except that the 2nd packet contains the address of the first of 2 consecutive registers to be written and is followed by 2 packets of data. The first data packet is written to the first register and the second data packet is written to the next consecutive register.

UPDATE REG SHORT—$xx from: any to: any

This is used to allow registers to be put on the BUS whenever a bit in the register has changed due to non-BUS activity (eg. a new receive mode during channel scan). This allows options to keep track of the current status of certain key registers without having to constantly enquire about them. A 2nd packet contains the address of the register and a 3rd packet contains its new data. The radio will ACK all updates from the CONTROL HEAD register set (addresses $00 to $1F) while the MASTER will ACK all others.

UPDATE REG LONG—$xx from: any to: any

This is the same as above except that the 2nd packet contains the address of the first of 2 consecutive registers to be updated and is followed by 2 data packets. The first data packet is the update of the first register while the second data packet updates the following register.

BIT CLEAR—$xx from: Control Head/Option to: any

This allows options to modify the radio system by changing one of the registers in the LONGHORN register set (see section 3.5). A 2nd packet contains the address of the register to be changed while a 3rd packet contains the address of the bit (0=bit 0, 7=bit 7) to be cleared (=0). The response is ACK.

BIT SET—$xx from: Control Head/Option to: any

This is the same as above except that the desired bit is set (=1) instead of cleared.

ACK—$xx from: any to: any

This response is required by some opcodes and does not require a response itself.

NAK—$xx from: any to: any

This is sent instead of the normal response when the received message has an invalid opcode. This does not require a response.

REG SHORT IS—$xx from: any to: any

This is the response to the READ REG SHORT message and is followed by a packet containing the data in the requested register. This requires no response.

REG LONG IS—$xx from: any to: any

This is the same as above except that the opcode is followed by 2 data packets. The first contains the data in the requested register while the second data packet contains the data in the next consecutive register.

NAME IS—$xx from: Radio/option to: Control Head

This is normally sent after a RESET message and is used to allow the MASTER to construct the MENU page (see sections 3.7 and 4.2.2). If the MENU page is already constructed, this opcode can be used to change an option's name. This opcode is followed by a control packet (TBD), a packet containing the address of the option and 4 packets containing the ASCII name for display on the MENU page. This opcode requires ACK as a response. When the address is 0, then the name is placed on every page above button $F and belongs to the high priority option.

*****NOTE: The current concept of display and button handling is being reviewed and will be updated in future issues of the document.

DISPLAY IS—$xx from: Radio/option to: Control Head

This is used by options to write to the display. It is followed by a packet which contains the data to be written into the control register (see section 4.2.2) and 5 packets containing the ASCII data. The data is written starting at the current cursor position and automatically 'wraps around' the upper right corner to the lower left corner and the lower right corner to the upper left corner. If the 8th bit of the ASCII character is set, then that character will be blinked. With proper use of the control register, this opcode can also be used to write to fixed, non-programmable display. See section 4.2.2. about details of writing to the display. This opcode requires an ACK for a response. It will be ignored by all control heads which did not request the display (by using the SHOW DISPLAY opcode).

*****NOTE: The current concept of display and button handling is being reviewed and will be updated in future issues of the document.

3.7 Power Cycling 3.7.1 Power Up

During power up, certain special actions take place. The Radio waits at least 50 msec to allow options to perform their power up routines and then sends a RESET opcode followed by a RQ DISPLAY to the control head. After the HOME page is put on the display, the radio relinquishes the BUS. The options then contend for the BUS, using it to read their OPTION STATUS registers to get their last state of operation, read the VIP MAP to see where their I/O devices are located on the VIP connector, and send their ASCII name up to the Control Head for display on the MENU page. If an option had its display showing during the previous power down, it can choose to restore the display to its previous state by writing to the display. If the first opcode received by options is not a RESET, then an error has occurred and the option should send out a RESET to warmstart the system (see section 3.9).

3.7.2 Power Down

There is no way to predict when power is removed from the system. The power switch is read approximately every 5 msec, but no supply hold up circuit exists. Thus, there is no guarantee that options will have time to do anything special after the power switch has been detected to go OFF. Thus, whenever the option feels that it is in a state that needs to be remembered, it will write this into its OPTION STATUS register (see section 6.2.3) without waiting for power down detection.

3.8 Transmitting

To speed up response to a PTT depression, PTT is brought out on the BUS as a dedicated line. All options can read it. If PTT is pressed and an option needs to participate in the ensueing transmission, it will contend for the BUS and configure the radio. Priorities are assigned to keep options from undoing what the other is trying to do.

If an option wishes to transmit, the PTT line is not used; the TX ON bit is used. In Systems 90 there was only one way to key the radio, namely PTT. In reality, PTT is only an input from the operator. Options may want to do different things depending on whether the transmission was PTT-originated or option originated (e.g. PTT ID). After the TX ON bit has been set, options again contend for the BUS to configure the radio if they need to participate at that time. Other options can also set their TX ON bits if they desire to have some control over when the transmission ends (such as reverst burst for PL). Whenever the TX ON bit is set, the radio may contend for the BUS to update the display by turning on the transmit indicator.

During transmission, the BUS again is in the idle mode. All lines and registers have been already setup and there is no activity on the BUS. The transmitter will power down only when each option which set their TX ON bit has also cleared their TX ON bit (or when the TOT expires).

Regardless of whether the transmission was initiated by PTT or an option, when an option gets done with an audio line (e.g. PTT ID), it will disconnect itself from the line to give others a chance to use it (thus when PTT ID is done with the TXAUD line, another line could then use it to transmit). Also, a high transmit priority option may steal a line that was already in use. Because of these conditions, options must constantly monitor the TXAUD routing while using (or wanting to use) the line in order to know if the line was stolen (and thus to not send its signal) or becomes available.

At the start of each transmission, regardless of the whether it was PTT or option originated, the radio places itself into a mode defined by the following registers:

TRANSMIT STATUS $22
TRANSMIT ROUTING $23
TOT $25
TRANSMIT MODE $2A
TRANSMIT PL/DPL $2C

At the end of each transmission, the above registers are restored to their 'default' value. The value is the same as the power up value if power were to be lost at that moment (i.e. TRANSMIT MODE=SELECTED MODE, TXAUD=disconnected, TRANSMIT PL/DPL, TOT, etc from the mode description in the EEPROM).

3.9 Error Handling

Errors occur due to outside noise sources or improper system utilization. Errors in data transmission are detected by the CRC (see section 3.1.2). If a CRC has detected an error, then no response will be returned. If no response was received within 1 packet time, then the original message is repeated up to TBD more times. If the message still did not get thru, then the option may (or may not) wish to print an error statement to the display.

Errors in execution of control messages are detected only upon attempting the execution. NAKs are sent when these errors are detected. It is the responsibility of the options to guarantee that they follow the recommended procedures outlined in this document. Only the address which was the object of transmission will send the NAK.

There may be cases where only part of the system gets a power-up reset (a coldstart). They are given the capability of causing the rest of the system to perform a warmstart. This is accomplished by getting access to the BUS and sending a RESET. This causes the entire system to revert to the power up sequence (eg. the radio sends a RESET followed by RQ DISPLAY). Options can tell if only their part of the system went thru a coldstart if the first message they receive is not a RESET.

Since LONGHORN uses CSMA/CD protocol to gain access to the BUS, it is possible that two (or more) options (or Control Head and Radio) may want to use the BUS at the same time. This is detectable by the transmitting options since the bidirectional BUS forces the receive and transmit lines to be tied together. Thus a device can read what was sent out. Each time a packet is to be sent out, the receive serial buffer is checked to see if it matches the previously sent data. If not, then a collision has occurred. It should be noted that a collision is detected only after a whole packet is sent. When a collision has been detected, the option immediately releases BUSY and waits a time associated with its address (TBD) before trying again.

Listeners on the BUS cannot tell if a collision has occurred. They are kept synchronized by the state of the BUSY line. Each time BUSY changes state, they should clear their receive buffers. Thus, during a collision, BUSY would be pulled low, a single packet sent, and BUSY pulled high. This causes all receivers to clear out the single packet they received.

If an option has been blind to the BUS for a while and returns finding the BUS is BUSY, it ignores all data transmissions until BUSY goes high. This is because it isn't synchronized with the rest of the system (e.g. is this packet a CRC, opcode, or data?).

4.0 SYSTEMS CONTROL HEAD

4.1 Physical Description

The main purpose of the control head is to provide the human interface to the options and radio. This is accomplished by scanning the unlabeled keys, writing to the display, reading various switches located at the control head (power, ignition, hangup switch) and providing an orderly access of this information to all options and the radio.

The LONGHORN control head is contained in a housing that is 1.50"D×4.41"H×7.16"W. It contains a 2 line×40 character, 5×7 dot matrix LCD display, a 16 button keypad, and an on/off switch. The back of the unit consists of connectors for the Microphone, Speaker, Power, Control Cable, and VIP.

4.1.1 VIP Connector

The VIP connector is a 37 pin 'mini-D' connector. Four separate female plugs will plug into this connector. The first contains 16 pins which are designed to accept individual wires. These are general purpose input and output pins and can be used by the (remote) options to drive horn and light relays or read an emergency switch and horn ring (see section 4.2.1). The next plug contains only two pins for the speaker and comes already connected to the speaker wire. The next two are for the orange and green leads to which it is attached. The last plug is for the microphone. A standard Motorola microphone with the HUB switch in the microphone housing will be used. All pins are rated for 7.5 amps.

4.1.2 BUS Connector

The BUS cable connector interfaces the control head to the radio and options.

POSITIVE GROUND

Only 19 pins are actually available as part of the control cable. Pins 2,3,4,14,15, and 16 are used to allow the connector to program the control head for positive or negative ground installations. The appropriate jumpers are shown in place. All pins can carry 7.5 amps.

4.2 Electrical Description

The circuits needed to perform the control head functions are few. Not included in this are the drivers for the display, the display itself, and the keypads. These are located on the display board and connect to this board (called the control board) via connector J4. The major portions of the schematic are the HD63A01V1 microcomputer, buffers for the BUS, CH BUSY, RA BUSY, IGN lines, the VIP, the 1k×4 CMOS RAM, power supplies, and some display support circuitry.

4.2.1 VIP

The VIP (Vehicle Interface Port) gives options the capability to communicate to the outside world. Since options don't need their own buttons or display, they may be physically located anywhere in the vehicle as long as the control cable can be connected to them. Thus, without the VIP, it can become difficult for an option to read a switch (e.g. Emergency) or control a relay (e.g. Select Call). During system configuration (done either in the factory or in the field), the location of each I/O device on the VIP connector is programmed into the EEPROM in the radio and is available to options via the VIP MAP registers. These registers occupy locations $40 to $5F in the LONGHORN register set and are detailed in section 3.5 These registers are normally read by the options following a RESET, allowing them to discover which VIP pin contains which I/O device without having the overhead of supporting their own non-volatile storage.

The signals on the VIP connector are digital in nature. The crossover from a '0' to a '1' is 2.2 v @ 0.8 ma. The input is a 2.7k resistor in series with a darlington NPN base with reverse bias protection while the output is an open collector darlington NPN with a flyback diode to SWB+. When left floating, the response is the same as an applied 0 v. Since the darlington buffers are inverters, a low input voltage is read as a 1' and a high voltage is a '0'. Each transistor can sink 400 ma (only one output on at any temperature) to 165 ma (all 4 outputs on at 85 C).

Some options will require a vast number of I/O lines. These will require their own box and I/O connector. The control cable will still connect to the unit thru the 25 pin BUS connector to allow interfacing with the control head display and keyboard. Options such as SIREN will also have its own box since it has its own high power audio PA chassis. It does not need to use the VIP to switch its external speaker since the speaker plugs directly into its chassis. An alpha-numeric keyboard would also have its own box since the VIP or the display keypad don't have this capability. A final example would be a printer. Although the VIP could conceivably be used, it would tie up the BUS and cause system response times to degrade.

Since some systems will have more than 1 control head, and thus VIP connectors, there may be confusion as to which VIP a device is connected. In particular, 2 control heads should not respond when asked to read an external switch. To solve this problem, 4 bits of the control head's OPTION STATUS register is reserved to indicate which VIP input pins are locally used. A control head will respond to a read of the VIP INPUT register only if it has been determined that the particular pin of interest is connected to it.

When writing to the VIP OUTPUT register, options are required to supply their address (see section 3.5). This allows the control head to perform a 'wired-or' function on each VIP output. If two options turned a pin on, then it will turn off only if two options wish to do so.

Whenever a VIP input pin changes state, the VIP INPUT register is put on the BUS using the UPDATE REG SHORT opcode.

4.2.2 Display

The display is a 2 line×40 character, 5×7 dot matrix LCD display with the capability of user-defined symbols. Above and below the display are a series of 8 buttons (16 total) which are used as soft keys. The meaning of the keys are dependent on what is written to the display. Thus as different options utilize the display, they can redefine the keys to suit their particular needs.

The display can be considered to consist of two registers and a pointer. The registers are the data and control registers while the pointer points to a location on the display or into the character generator RAM. To move the cursor, the pointer is pointed to the appropriate location on the display. Data can then be written on the display by writing into the data register. Each time a character is written, the cursor is automatically shifted to the next position on the display (the cursor moves from left to right and wraps around from the upper right corner to the lower left corner). Special characters are defined by first pointing the pointer to the character generator RAM and then writing into the data register. The data is in 7 bit ASCII code. If the 8th bit is set, the character is to be blinked. This allows easy annunciation.

The allowable control words are listed below and are similar to those used by the Hitachi HD44780A00 LCD drivers. These drivers recognize other controls as well but their use in LONGHORN is forbidden since options are not given the flexibility to easily write more than one control word at a time (the control head does not check for violations). Without this restriction, it would become difficult for an option to reconfigure a display which has been setup for some special mode of operation. On power up, the display is configured for: cursor moves RIGHT, display shift OFF, display ON, cursor OFF, cursor blink OFF, underline OFF, 2 lines, 5×7 font.

Clear Display ($01): Clears the entire display and returns the cursor to the upper left corner.

Return Home ($02): Returns the cursor to the upper left corner without affecting the display.

Underline Off ($0B): Turns off the underline at the current cursor position.

Underline On ($0C): Underlines the current cursor position.

Underline Blink (%0D): Turns on and blinks the underline at the current cursor position.

Light On/Off (%0E): Indicates that the following data is to be used to turn on lights in a non-ASCII type display. Each following byte represents 8 lights with bit 0 representing lamp 0, bit 1 representing lamp 1, etc. A '1' turns a lamp on and a '0' turns the lamp off.

Light Blink ($0F): Indicates that the following data is to be used to blink lights in a non-ASCII type display. This is similar to the above except that a '1' turns on and blinks a lamp while a '0' does nothing to the lamp (it remains on or off).

Set Character Generator Ram Address (%0.1xxxxxx): Points the cursor to the indicated address of the character generator RAM. This RAM consists of 64 bytes and gives the capability of defining 8 custom characters. Each character consists of 8 bytes each of which defines one of 8 rows in the 5×7 (plus underline) format. Since each row of the 5×7 format has only 5 locations, the upper 3 bits are ignored. Writing into the data register following this control word will place data into the character generator RAM until the next control word is written. Custom characters start at locations $0, $8, $10, $18, $20, $28, $30, and $38. As an example, to write an 'up arrow', $40 is written into the control register to point it to the first custom character. The following data is then written into the data register: $4, $E, $15, $4, $4, $4, $4, $0.

Set Display Data Ram Address (%1xxxxxxx): Points cursor to the indicated position on the display. Address $80 corresponds to the upper left corner. Address $C0 corresponds to the lower left corner. Since this display has only 40 character lines, addresses $A8–$BF and $E8–$FF place the cursor off to the right of the display and data written will not be seen. Data written into the data register following this control word is put on the display starting at this location. Data is written in modified ASCII. If the 8th bit is set, then the character is to be blinked (note that this is different than the Hitachi drivers). The 8 custom characters are written to the display by writing the ASCII control codes $0–$7 (only the 3 LSB are used—writing A$8–$F will give the same results as writing $0–$7).

Options write to the control and data registers by using the DISPLAY IS opcode. Only 5 ASCII characters are written at a time. To fill up the entire display, several DISPLAY IS opcodes are sent.

A small library of custom characters is available for use by all options. This consists of the 'up arrow' (ASCII $0) and 'down arrow' (ASCII $1). These two ASCII characters are reserved by the system and should not be modified by the options.

On power up, the options give the control head their names to be put on the menu page. This is the only page remembered by the control head. Currently, enough RAM exists to remember only one MENU page. Thus initial systems are limited to only 14 named options. The CMOS RAM external to the processor is used only as temporary storage to remember display data for blinking applications. Also on power up, an option can claim to be 'high priority' (see section 6.2.1). This allows its name to be placed on every page above button #$F. Thus when writing a display, options should take care to leave the upper right 5 and lower right 5 characters blank. The control head will over write the upper right with 'HOME' and the lower right with the name of the high priority option.

By cutting the appropriate jumper on the option boards and including a custom display EEPROM option, users can create their own displays. The definitions of the buttons made by the options will remain unchanged, but the label can change. This is useful for foreign displays as well as changing displays (e.g. changing 'MSG1' to '10-7'). This is accomplished thru the use of the RQ DISPLAY and SHOW DISPLAY opcodes. When an option desires a display to be shown, it sends a RQ DISPLAY. The control head responds with a SHOW DISPLAY opcode. The external EEPROM display option reads the address associated with the SHOW DISPLAY opcode and puts the EEPROM-resident display data on the BUS using the DISPLAY IS opcode. If the appropriate jumper is not cut on the option, then the option provides its own ROM-resident display.

*****NOTE: The current concept of display and button handling is being reviewed and will be updated in future issues of the document.

4.2.3 Keypad

The keypad is arranged in a 2×8 format with 8 buttons above the display and 8 buttons below the display. These are addressed from 0 (upper left) to 7 (upper right) and from 8 (lower left) to $F (lower right). These are accessible by reading the BUTTON register of the control head (see section 3.5). All of these buttons can be used by options when their display is currently being shown except for button 7 and button $F. Button 7 is reserved for displaying the word 'HOME' and button $F is reserved for displaying the name of a high priority option if it exists (see section 6.2.1).

The control head does very little interpretation of button closures. It only checks to see if it was button 7 ('HOME' or 'MENU') or button $F (the high priority option). If it was 'MENU' then it simply writes the option names on the display. If it was 'HOME' then it sends a SHOW DISPLAY to the radio. If it was button $F, then it sends a SHOW DISPLAY to the high priority option. The control head also interprets all key closures on the MENU page. It responds by sending a SHOW DISPLAY to the appropriate option (or radio). It forwards all other key closures to the option whose display is currently being shown by sending an UPDATE REG LONG opcode and writing the DISPLAY and BUTTON registers.

Button scrolling is accomplished by the control head sending the UPDATE REG LONG opcode, waiting 0.5 sec, and then sending it every 53 msec thereafter. If the scrolled button is let go during this latter time period, then the UPDATE REG LONG opcode is again sent showing that no buttons are pressed (see section 3.5).

Each time a button is pressed, the radio automatically sends a 'beep' for audio feedback. No audio feedback is provided during button scrolling.

There will exist some control heads which have no redefinable keys. These are indicated by a bit in the DISPLAY register (see section 3.5). When reading buttons from a control head, options should check this bit to see which set of buttons are being used. Options thus need the capability to read two sets of buttons.

*****Note: The current concept of display and button handling is being reviewed and will be updated in future issues of the document.

4.3 Fixed Display Control Heads

There exists a need for a low cost control head to work with a serial BUS radio. This control head contains indicators to display the equivalent of the HOME page (e.g. Volume/Squelch number, Mode number, TX indicator, etc) and buttons to make HOME page-type selections (increment volume, monitor on/off, etc.). This control head has no capability for option expansion except for radio integral options not requiring a display or button control.

*****NOTE: The current concept of display and button handling is being reviewed and will be updated in future issues of this document.

4.4 Diagnostics

By holding down key $7 on the HOME or MENU page and then depressing any other key, the control head is put into a diagnostic mode. It will perform some self test routines and perhaps even some system test routines. These will be further detailed in future issues of this document.

4.5 Multi-Control Head Systems

Every control head has a series of jumpers on its board to determine if the control head powers up as a Primary or Secondary Control Head. Although both types are treated like options as far as BUS contention is concerned, only the Primary control head implements the Control Head Register Set (see section 3.5). Thus only one Primary control head can exist on a system.

The system will respond to keypad use from either control head. When a button is pressed, the Secondary control head will send an UPDATE REG LONG with display and button information. The system will react as if this had come from the Primary. In fact, the rest of the system doesn't even know who the source was. A Secondary can also have its keypad and/or its display deactivated as part of its operating modes.

A Secondary can request to become the Primary (the original Primary then becoming a Secondary) by writing a '0' into PRI of the CH STATUS register (see section 3.5). At that moment on, it is the Primary control head and implements the CH Register Set. As part of normal operation all options save their status in their OPTION STATUS register (see section 6.2.3). If a Secondary was acting Primary during a power cycle, it would have recorded the fact in its OPTION STATUS register. Thus on power up, it could again become the Primary.

It is possible for different control heads to display different things. This is because a control head will ignore a DISPLAY IS opcode unless it was the one which sent the SHOW DISPLAY opcode. Thus if an option name was pressed on the MENU page at the rear, only the rear control head will send a SHOW DISPLAY and only the rear will receive the DISPLAY IS opcode. This also makes it easy to implement systems with a mixture of display types. In response to a SHOW DISPLAY opcode an option sends a DISPLAY IS opcode and both ASCII and lamp data is sent since the option doesn't known what type of control head requested the display.

Whenever volume is changed on a control head, only the volume coming from the local speaker will change (an operator at the front of a vehicle will require a different, and independent, volume setting than one sitting at the rear). This requires a separate audio amplifier for each control head (as is done today with the Power Voice Speaker). This is accomplished with the SECONDARY VOLUME registers. Although part of the CONTROL HEAD register set, these are actually resident in an EMS option which contains the electronic attenuators as well as other required interfaces for a multi-control head configuration. To change volume, a Secondary control head would write into the SECONDARY VOLUME register located at the register address equal to the Secondary's address (note that they both run from $4 to $7). Only the appropriate Secondary and EMS option box will respond to accesses to the SECONDARY VOLUME registers. The bits in the register are defined the same as the bits in the VOLUME register of the RADIO register set (see section 3.5).

The EMS option has a jumperable address which is used to define the SECONDARY VOLUME register address. It also has an option address and contains the NAME and option display needed for operator selectable multi-control head functions. Its main purpose is to act as a place for the SECONDARY VOLUME register to reside as well as the circuitry to implement volume attentuation, Intercom, and PTT priority functions. This option will be detailed in future issues of this document.

4.6 Configurations

There are 4 jumpers located on the control head. These must be properly setup before power on in order for the system to properly operate. They have the following meaning:

| JU4 | Power Up Mode | |
|---|---|---|
| in | PRIMARY | |
| out | SECONDARY | |
| JU3 | Display/Keypad type | |
| in | ASCII/programmable | |
| out | fixed | |
| JU2 | JU1 | Address |
| in | in | 4 |
| in | out | 5 |

-continued

| | | |
|---|---|---|
| out | in | 6 |
| out | out | 7 |

Only 1 control head per system should have JU4 in place. Otherwise there will be no CH Register Set.

JU3 should be set according to the type of display being used. It is used by the control head microprocessor to define how the displays are to be driven. An incorrect setting will cause a meaningless display.

JU2 and JU1 are used to determine the control heads address. Each control head in a system should have a different setting. Also, the resulting address should not already be occupied by another option (if so, change the option's address). Otherwise, there will be BUS contention and garbled data will be put on the BUS.

Also, the OPTION STATUS register associated with each control head must be initialized to indicate where the VIP input pins are being used. Failure to correctly initialize the OPTION STATUS register may result in garbled data on the BUS and the I/O device never getting accessed.

5.0 RADIO

5.1 Physical Description

The first radio to make use of LONGHORN will be the Syntor X. It will keep its existing mechanical structure. The system is oriented most toward trunkmount radios although future dashmount models can certainly use the system if they provide the proper overhead.

5.2 Electrical Description

The radio will embody all the existing Syntor X circuitry but with the personality board replaced with a new board. This board will contain two HD63A01V1 CMOS microcomputers. BUS interface, EEPROM, and audio routing circuitry utilizing the Universal Chip Set (UCS). LONGHORN considers the SCAN and DPL/PL options internal and intimate with other radio functions.

The radio accesses the BUS in the same manner as an option does (see section 3.0). It has address 1 reserved for it and can be treated in all respects as an option residing at address 1. The internal Scan and Operator Select PL/DPL also have their own addresses since they have their own name on the MENU page.

5.2.1 Audio Routing

To guarantee flexibility for all options, various points in the audio path need to be accessible. The MIC, TXAUD, RXAUD, and DISC lines are all available to the control cable. Both the MIC and DISC can be disconnected from their normal path to reduce interference when the path is used for other purposes. See section 2.2 for details on voltage and drive requirements on these lines. It should be noted that the only audio output line from the radio is the DISC line.

The TXAUD and RXAUD lines are general purpose, programmable lines which can be used to inject signals into various points along the transmit and reveive paths, respectively. To minimize contention, TXAUD is used on a priority basis while RXAUD is used on a first-come first-served basis. Thus when MVS has the RXAUD line used for playing back a message, it is no longer available for use (such as an MDC 'beep') until it is freed up. It is up to the options to follow this priority. The radio does not check for violations but does only what it is told to do. An exception to this relates to the use of the radio alert tone. The radio has absolute priority over what is heard at the speaker. When ever the alert tone is used the RXAUD line will be disconnected. The RECEIVE ROUTING register will *not* be changed to reflect this. When the alert tone is finished, the RXAUD line will be restored to the state specified in the RECEIVE ROUTING register.

To use TXAUD for transmitting, an option needs to assign its priority and band (either audio or sub-audio) to the line. Thus two options can use TXAUD if they occupy different bands. An option can steal TXAUD if it occupies the same band but has a higher priority than an existing option. This requires that while using TXAUD, an option must monitor audio routing activity to see if its line has been stolen (similarly, if TXAUD is to be used but the line is busy, the option must monitor audio routing to see when it becomes free). If it does get stolen, it must then turn off its signal so it won't corrupt the higher priority transmission. Thus, once a high priority transmission takes place, it won't be aborted until after it is finished. Priorities are defined as emergency > short data > voice/DVP > long data/MVS.

An apparent conflict arises when a sub-audio band signal wants one routing while an audio band signal wants another. This is really no problem because on the RXAUD line, no sub-audio band signal should be present since it can't be heard out the speaker anyway. On the TXAUD line, the sub-audio signal is by definition bandlimited and shouldn't care whether it goes thru the splatter filter or not. Thus, the TXAUD routing is determined by the audio band signal whenever both an audio and sub-audio signal are present.

5.2.2 Non-Volatile Storage

The SYNTOR X Low Band radio requires EEPROM storage for its mode definitions. The original SYNTOR X bipolar PROM is not allowable since it is not remotely programmable. Although not part of the LONGHORN spec, it is illustrative to list how this memory is utilized as an example for future radios. The mode definition contains bytes as follows:

| | |
|---|---|
| MODE NAME | 8 bytes/mode |
| SYNTHESIZER | 5 bytes/mode |
| PL/DPL | 4 bytes/mode |
| SCAN LIST | 8 bytes/mode |
| SCAN PRIORITY | 2 bytes/mode |
| TOT/SQ TYPE | 1 byte/mode |
| MISC ENABLES | 1 byte/mode |
| | 29 bytes/mode |

Also, the radio needs to remember the operator selected scan lists. For the SYNTOR X Low Band, this consists of storing two priority channels (1 byte each) and a 64 bit scan list (8 bytes) in the EEPROM (a total of 10 more bytes). Additionally, the radio is required to remember certain statuses which are to be restored after a power cycle. These are discussed in section 3:5. A 64 mode radio thus requires 1.9k bytes of storages. A 128 mode radio requires 3.7k bytes and will be available as an option in the SYNTOR X Low Band radio.

Besides the EEPROM storage it needs for itself, the radio also contains the EEPROM storage required by LONGHORN. This consists of the storage required to implement the VIP MAP registers and the OPTION STATUS registers. These are accessed using normal BUS opcodes with the radio providing the interface between the LONGHORN register model and the physical locations residing in the EEPROM.

Although options have indirect access to the EEPROM via the OPTION STATUS and VIP MAP registers, they are also given the capability to access the EEPROM directly. This is accomplished by manipulating the EEPROM ACCESS registers which are located at addresses $1D to $1F. It should be noted that the only requirement LONGHORN places on the radio is that it emulate a portion of the LONGHORN register set. As new radios are introduced, they may have entirely different methods of storing the required data in the EEPROMs. Thus it is impossible for a general purpose option to directly access the EEPROM and have it always be modifying the same data in different radios. It is envisioned that this capability will only be used by a prom programmer unit which connects into the LONGHORN bus. This allows the EEPROM to be field programmable, giving users the capability to change parameters such as mode names, frequencies, and ID's. Each new radio would thus have its own prom programmer software. The EEPROM ACCESS registers are described in section 3.5. For further discussion on programmability, see section 8.0.

5.2.3 Display

The radio contains a ROM-resident display for the 'HOME' pages. When requested by the MASTER, the radio will write its display, substituting the correct values for the volume, squelch, mode name, and the state of the various options such as monitor, talkaround, and extender. As the mode (or volume) changes, enough flexibility is built into the DISPLAY IS opcode (see section 4.2.2) that the radio can update just that portion of the display.

For fixed displays, the radio uses the DISPLAY IS opcode to write $0E (LAMP ON) into the display's control register to write the following data:
Byte 1: Mode number (2 BCD digits)
Byte 2: Vol number (2 BCD digits)
Byte 3: SQ/misc (1 BCD digit/4 bits)

These will be ignored by ASCII type programmable displays. Since the radio doesn't know what type of display exists on the BUS, it will send both types of display data.

*****NOTE: The current concept of display and button handling is being reviewed and will be updated in future issues of the document.

5.3 Unmuting Logic

The radio provides two points in the receive audio path for muting. The first point is after the discriminator and the second is after the electronic volume attenuator. Information from the RECEIVE ROUTING register, RECEIVE STATUS register, and the radio operating condition is combined to determine the present state of these muting controls. These bits are defined in section 3.5 but are expanded upon below:

DET EN—Detect Enable
Specifies if an unmute detect from the radio should cause receive audio to pass through the muting gates. Typically, this is used by an option to inhibit receive audio at the discriminator during the time an option is using the receive audio path.

RXAUD ROUTING—Receive Audio Routing
Specifies the point that the option audio is to be introduced in the receive audio path. Any non-zero value specifies that an option wishes to use the receive audio path and that the electronic volume attenuator must not be muted. Additionally, any use of the alert tone requires that the attenuator must not be muted.

CHN ACT—Channel Activity
The output of the fast (time constant <5 msec typically) radio squelch detector.

SQ DET—Squelch Tail
The output of the slow (time constant varies with RF level but general ranges from 10 to 100 msec) radio squelch detector.

PL DET—Private Line Detect
The output of the internal microcomputer Private Line detector.

RPL EN—Receive Private Line Enable
Specifies if the Private Line Detect bit should be used in the determination of muting and unmuting. This bit is initially set from the EEPROM but will normally reflect the condition of the Monitor Switch or the Hang Up Box.

MUT TYP—Mute Type
Specifies the audio conditions required to mute receive audio. Presently defined are OR (1) and PCI (0). If RPL EN=1 (enabled), OR will mute the receive audio if SQ DET or PL DET=0 (any loss of detect) and PCI will mute if PL DET=0 (loss of Private Line). If RPL EN=0 (disabled), OR will mute if SQ DET=0 (loss of squelch tail) and PCI will mute when SQ DET and PL DET=0 (both not detected).

UNM TYP—Unmute Type
Specifies the audio conditions required to unmute the receive audio. The unmute condition has priority over the mute condition should they both occur. Presently defined are AND (1) and PCI (0). If RPL EN=1 (enabled), AND will unmute the receive audio if SQ DET and PL DET=1 (both detected) and PCI will unmute if PL DET=1 (Private Line detected). If RPL EN=0 (disabled), AND will unmute if SW DET=1 (squelch tail detected) and PCI will unmute if SQ DET or PL DET=1 (any detect).

The use of these bits to control the two audio mute gates are illustrated in the table below. Inputs from the radio system are shown to represent information from various radio routines such as Channel Scan and Priority Scan. It should be noted that the BUS does not have direct control over either of the two muting gates, but the radio controls the gates as required for the various input combinations.

| RPL EN | PL DET | SQ DET | UNMUTE TYPE | UNMUTE | MUTE TYPE | REMUTE |
|---|---|---|---|---|---|---|
| 0 | 0 | 0 | AND | 0 | OR | 1 |
| 0 | 0 | 1 | AND | 1 | OR | 0 |
| 0 | 1 | 0 | AND | 0 | OR | 1 |
| 0 | 1 | 1 | AND | 1 | OR | 0 |
| 1 | 0 | 0 | AND | 0 | OR | 1 |
| 1 | 0 | 1 | AND | 0 | OR | 1 |
| 1 | 1 | 0 | AND | 0 | OR | 1 |
| 1 | 1 | 1 | AND | 1 | OR | 0 |
| 0 | 0 | 0 | PCI | 0 | PCI | 1 |
| 0 | 0 | 1 | PCI | 1 | PCI | 0 |
| 0 | 1 | 0 | PCI | 1 | PCI | 0 |
| 0 | 1 | 1 | PCI | 1 | PCI | 0 |
| 1 | 0 | 0 | PCI | 0 | PCI | 1 |
| 1 | 0 | 1 | PCI | 0 | PCI | 1 |
| 1 | 1 | 0 | PCI | 1 | PCI | 0 |
| 1 | 1 | 1 | PCI | 1 | PCI | 0 |

5.4 Transmit Logic

The determination of whether to transmit or not is based on various bits in the TRANSMIT STATUS and TRANSMIT registers. The input from the radio represents information from various radio routines such as PL encoding and TOT. PTT is given to the radio from the control head through a dedicated line. The TX ON bits from each option are OR'ed together. Only when all options desire to dekey the transmitter, will TX ON actually go low. This will dekey the radio only if the PTT line is low.

5.5 Diagnostics

The radio contains shorting pads which, when shorted, places the radio into a self-test mode. When the short is remove, the radio will finish its current test routine and cause the system to warmstart (see section 3.9). Further details will be given in future issues of this document.

When button #7 is held down on the MENU or HOME page and another key is pressed, the radio is placed in a diagnostic mode. It will perform some self test routines and perhaps even some system test routines. These will be further detailed in future issues of this document.

5.6 Multi-Radio Systems

LONGHORN allows multi-radio systems to be implemented fairly easily. Before this can be discussed, some realizations need to be made. For two radios to operate simultaneously, two complete sets of options need to be installed as is done today. This is because most options (MDC-600 being the ideal example) can only look at 1 discriminator at a time. If 2 radios are desired to operate concurrently, then each needs its own options. An external interface box is added to connect the two radios to one control cable. It detects the presence of carrier on either radio through the Channel Activity (CH ACT) lines and uses this information to rout the radios DISC and SPKR lines to the control cable. However, even with this interface, the operator is limited to listening to only one radio at a time.

The external interface box keeps both radios busy by artificially holding CH BUSY low. When an internal option (or a radio) wishes to use the BUS, it lets the interface box know by pulling a BUS RQ line low. This informs the inerface box to release CH BUSY if the BUS is indeed free. Also, the interface box uses the CH ACT lines to rout SPKR and DISC audio onto the control cable. *****NOTE: The need for CH BUSY and BUS RQ is dependent on whether a collision can be detected across 22' of cable. This is subject to further investigation.

Multi-band scanning is possible since each radio is a (almost) closed system with its own scan list and set of options. Whenever a carrier is received, its audio gets routed to the control cable (unless the cable already has audio on it). It is also possible to select radios on a mode-by-mode basis. As modes are change by the operator, some radios may try to implement an 'invalid' mode. In such a case, the radio would neveer attempt to receive or transmit.

External options may have a difficult time operating in a multi-radio system since the DISC available to it changes as the radios sense channel activity. Also, since the radios have their own (and perhaps different) set of options, their respective registers will be in different modes. The entire multi-radio concept will be detailed in future issues of the document.

5.7 Configurations

For proper operation on power up, certain items must be predefined in the radio EEPROM. This will typically be done by an external prom programmer unit with software customized for each radio model. For the radio to operate, the mode definitions need to be set up. The structure of these bits will be highly dependent on which radio is currently being configured.

Scan and operator select PL/DPL are considered internal to the radio. Their addresses are stored in the EEPROM and need to be defined. These addresses should be different from all other option addresses or garbled data on the BUS will result. Also, the Operator Select PL/DPL option needs a list of available codes.

Although it is not necessary for proper operation, it would be desireable to program an initial value for the squelch, volume, and mode settings. This will keep the technician from getting blasted out of his chair when he first turns on his brand new radio with the volume all the way up.

6.0 OPTIONS

6.1 Physical Description

The options can exist in any of a number of places. Typically they will be resident in the radio or in a separate remote options box. An option occupies a PC board with connectors for connecting it to the BUS. If an option requires its own box (e.g. SIREN, telephone interconnect), then it can also contain any other I/O it needs. All options internal to the radio will share BUS drivers, regulated 5 v, and a crystal oscillator (4.9152 MHz) as will options in a common remote box.

According to the MARKETING AUTHORIZATION, the options to be made available on the LONGHORN system are listed below. Also, requirements of DCS and EMS products will be met.

MDC 600 (ID, Sel Cal, Status/Message)
MVS-20
DVP
Trunking
Siren/PA
DTMF Encode/Decode MPL/DPL
Channel Scan

6.2 Electrical Description 6.2.1 High-Priority Options

LONGHORN has reserved button $F to call up a high priority option. This option is determined on power up. If bit 7 of an OPTION STATUS register (see section 6.2.3) is set, then that option has high priority. The status information for the high priority option is stored in address $60 of the OPTION STATUS register set (eg. SIREN with WAIL turned on). Thus a high priority option really has 2 OPTION STATUS registers. One to restore itself to the state it was in when power was last removed and one to tell it what to do when button $F is pressed. Only one option is given high priority per system and is set up during system configuration. When writing names to the Control Head for MENU page construction, the high priority option uses address $0 to instruct the control head that the following name is the high priority name and to place it on every page above button $F. When button $F is pressed, the Control Head sends a SHOW DISPLAY message to option address $0. This causes the high priority option to go into its high priority mode of operation.

6.2.2 Display

After a hardware reset or a RESET opcode, options should inform the Control Head about what name to put on the MENU page by using the NAME IS opcode. This causes the Control Head to assign a button to the option address. If a NAME IS opcode is sent later, when the address has already been assigned a button, then the Control Head will write this new name in place of the old name and will not assign it a new button. To get more than 1 button, options need more than 1 address. If a name of 4 ASCII blanks are sent ($20), then a button will be reserved but a name of       will be displayed. If 4 ASCII nulls ($00) are sent, then a button is not reserved (in fact, the option does not even need to inform the Control Head of its presence on the BUS).

The control head remembers the MENU page. Only one MENU page (14 option names) will be remembered due to RAM limitations. Thus, systems will initially be limited to a maximum of 14 named options.

Option are free to use the display as they see fit, subject to human interfacing considerations. It is not desireable for an operator to be driving around with his display changing on him often. Typically, options should not use the display unless the operator called them up from the menu page or if the options have something new to say (presumably triggered remotely by a base). The latter case can be handled with the least amount of operator confusion by utilizing the ANNUNCIATOR register (see section 3.5), although immediately writing to the display can certainly be done by using the RQ DISPLAY opcode. For a more thorough discussion on display manipulation, see section 4.2.2.

Since a non-programmable display may also exist on the BUS, whenever a display is written, both the ASCII data and lamp data should be written. These are both handled by the DISPLAY IS opcode and are discussed in section 4.2.2.

*****NOTE: The current concept of display and button handling is being reviewed and will be updated in future issues of the document.

6.2.3 Non-Volatile Storage

The LONGHORN register set allows TBD bytes of EEPROM storage for each option address (TBD bytes total). These are accessed thru the OPTION STATUS registers which physically reside in the radio and are described in section 3.5.

Although TBD bytes of storage is allocated for each option address, some options may require more. These must be located at and maintained by each option. An example would be the information needed for mode steering. Given an existing mode, an option needs to know whether to change modes or not and which mode to change it to. This information is contained and supported on each option board.

As an alternative, options can get more storage if they occupy more than 1 address. In this case, they get TBD bytes for each address they reside at.

6.3 Configurations

Before the system can operate properly on power up, the options need to be configured. The OPTION STATUE register may need to be initialized for some options. Bit 7 should be set for only one option if the high priority feature is desired. Failure to allow only one high priority option will result in garbled data on the BUS and neither option will be accessed. Some options may also have their own local non-volatile storage. These may also need to be properly initialized.

Each option will be built with a predefined address. It may be necessary to modify the address by cutting/installing jumpers to keep 2 options from occupying the same address. Also, a jumper exists to specify whether the internal ROM-resident or an external EEPROM-resident display is to be used. Incorrectly setting this jumper will cause the wrong display to be shown.

7.0 EXAMPLES

The following examples illustrate activity on the BUS in typical situations. They can be used to give a feel for what type of data occurs on the BUS as well as how some of the registers are to be used. Included in the descriptions are estimated times required to get certain key functions accomplished. Reduced values in parenthesis indicate times required to get these functions accomplished when the options automatically keep track of certain key registers in the RADIO register set. None of these times include opcode processing time.

7.1 SCAN/PTT ID/Status

Consider a radio system which has Scan. PTT ID, and Status. During power up the radio sends a RESET and writes its display to the control head. Then, the control head is told that there are (only 2 options on the BUS and puts their name on the MENU page (the PTT ID option requires no display or buttons and is thus transparent to the system at this point). The Scan and Status then read their last known status from their OPTION STATUS registers. In this particular case the Scan had saved its last user selected Scan list of 8 modes and the Status had no status selected. Since the Scan is internal to the radio microprocessor, it did not need to use the BUS in order to do this. The BUS now becomes idle with no data being sent.

When a receive channel is detected, the radio updates the display to show what mode it is. When the receive mode goes away, the display is again updated to show that the radio is now scanning. If talkback scan is present, then the radio performs a REGUPDATE as the transmit mode has temporarily shifted to this received mode. If the talkback timer times out, the radio switches back to its default mode and again does a REG UPDATE.

When PTT is pressed, the radio and PTT ID contend for the BUS. The radio keys up and wishes to write this to the display. It also wishes to send an UPDATE REG LONG showing that it is keyed up. The PTT ID wishes to grab the TXAUD line in order to send its PSK. When PTT ID is done, it relinquishes the line and lets other options use it (in this case there happens to be no other option). The BUS remains in an idle state until PTT is dropped which causes the radio to immediately dekey (no DPL/PL). The TXAUD lines are cleared and the radio is now available to respond to another PTT.

Suppose the user wishes to send in a message using his Status unit. First he presses the STATUS button on the MENU page. The Control Head sends a SHOW DISPLAY to the Status option which response with a DISPLAY IS. This display then appears and the user presses button #3 which has been labeled MSG1. The Control Head then puts its DISPLAY and BUTTON registers on the BUS showing that button #3 on the Status page has been pressed. The option knows that this is a message #1 command and begins to configure the radio registers to transmit the message. The radio has been reconfigured to not only allow the Status option to send the MDC 600 signal down the TXAUD line (the PTT ID unit uses the TXAUD line only for PTT originated transmissions) but also to steer the frequency. The radio informs the control head of the transmit data (which is displayed) and begins transmitting. After the appropriate time delay, the Status unit transmits its data packet and dekeys the radio.

7.1.1 BUS Activity

The signals appearing on the BUS during the above example are shown on the next page. Important response times are (assuming 9600 bps):

Power up sequence completion:
  194 packets
  202 msec+50 msec=252 msec

Talkback scan complete:
  47 packets
  49 msec
Depressing PTT to start of PTT ID:
  37 (30) packets
  39 msec+5 msec=44 msec
  (31) msec=(36) msec
PTT ID done with TXAUD to TXAUD release:
  4 packets
  4 msec
PTT release to radio dekey:
  0 packets
  5 msec
Status button pressed to new display:
  163 packets
  170 msec+5 mesc=175 msec
MSG1 button pressed to start of MSG1:
  38 (25) packets
  40 msec+5 msec=45 msec
  (26) msec+5 msec=(31) msec
MSG1 done to radio dekey:
  4 packets
  4 msec

| OPERATION | MESSAGE | FROM | TO | #PACKETS |
|---|---|---|---|---|
| | (assume 50 msec for hardware power up) | | | |
| Power up | RESET | R | CO | 2 |
| | RQ DISPLAY | R | C | 3 |
| | SHOW DISPLAY | C | R | 3 |
| HOME page | DISPLAY IS | R | C | 16*8=128 |
| | ACK | C | R | 16*2=32 |
| Scan initialization | NAME IS | O | C | 8 |
| | ACK | C | O | 2 |
| Status initialization | NAME IS | O | C | 8 |
| | ACK | C | O | 2 |
| OPTION STATUS | READ REG SHORT | O | R | 3 |
| | REG SHORT IS | R | O | 3 |
| | : | | | 200 |
| Channel Detected | : | | | |
| MODE registers | UPDATE REG LONG | R | C | 5 |
| | ACK | C | R | 2 |
| Write RX mode name | DISPLAY IS | R | C | 2*8=16 |
| | ACK | C | R | 2*2=4 |
| New Transmit name due | DISPLAY IS | R | C | 2*8=16 |
| to Talkback Scan | ACK | C | R | 2*2=4 |
| | : | | | 47 |
| | : | | | |
| PTT pressed | | (assume 5 msec detect time) | | |
| Tell BUS radio keyed | UPDATE REG LONG | R | CO | 5 |
| | ACK | C | R | 2 |
| | RQ DISPLAY | R | C | 3 |
| | SHOW DISPLAY | C | R | 3 |
| Tx indicator | DISPLAY IS | R | C | 8 |
| | ACK | C | R | 2 |
| PTT ID | (READ REG LONG) | O | R | (3) |
| | (REG LONG IS) | R | O | (4) |
| | WRITE REG LONG | O | R | 5 |
| | ACK | R | O | 2 |
| | : | | | 37 (30) |
| PTT ID done | : | | | |
| Release TXAUD | WRITE REG SHORT | O | R | 4 |
| | ACK | R | O | |
| | : | | | |
| PTT released | | (assume 5 msec detect time) | | |
| Tell BUS radio dekeys | UPDATE REG SHORT | R | CO | |
| | ACK | C | R | |
| | RQ DISPLAY | R | C | |
| | SHOW DISPLAY | C | R | |
| TURN off TX indicator | DISPLAY IS | R | C | |
| | ACK | C | R | |
| | : | | | |
| Status button pressed | | (assume 5 msec detect time) | | |
| | SHOW DISPLAY | C | O | 3 |
| Put up Status page | DISPLAY IS | O | C | 16*8=128 |
| | ACK | C | O | 16*2=32 |

-continued

| OPERATION | MESSAGE | FROM | TO | #PACKETS |
|---|---|---|---|---|
| | : | | | 163 |
| | : | | | |
| Button #3 pressed | | (assume 5 msec detect time) | | |
| DISPLAY/BUTTON registers | UPDATE REG LONG | C | RO | 5 |
| | ACK | R | C | 2 |
| Status checks TXAUD | (READ REG LONG) | O | R | (3) |
| | (REG LONG IS) | R | O | (4) |
| Get TXAUD, set TX ON | WRITE REG LONG | O | R | 5 |
| | ACK | R | O | 2 |
| Get current TX mode | (READ REG SHORT) | O | R | (3) |
| | (REG SHORT IS) | R | O | (3) |
| New TX mode | WRITE REG SHORT | O | R | 4 |
| | ACK | R | O | 2 |
| Tell BUS radio keyed | UPDATE REG LONG | R | C | 5 |
| Status message starts | ACK | C | R | 38 (25) |
| | RQ DISPLAY | R | C | |
| | SHOW DISPLAY | C | R | |
| TX indicator on | DISPLAY IS | R | C | |
| | ACK | C | R | |
| Status done | : | | | |
| Dekey radio | BIT CLEAR | O | R | 4 |
| | ACK | R | O | |
| Tell BUS radio dekeyed | UPDATE REG SHORT | R | CO | |
| | ACK | C | R | |
| | RQ DISPLAY | R | C | |
| | SHOW DISPLAY | C | R | |
| Turn off TX indicator | DISPLAY IS | R | C | |
| | ACK | C | R | |
| | : | | | |

7.2 Scrambler/Duplex Radio

Duplex radios fit very well into LONGHORN. One radio has no transmit frequencies in its mode list while the other has no receive frequencies. Audio routing occurs in both radios, but the TXAUD line is only effective in the transmit radio and the RXAUD line is only effective in the receive radio. A Scrambler exists for both transmit and receive. The receive Scrambler is always listening to the DISC line for coded information and normally sends its decoded voice down RXAUD into the attenuator. The transmitting Scrambler is always listening to the MIC line and sends its encoded voice down the TXAUD line into the splatter filter. Thus all lines are tied up while the system is transmitting and receiving. If another option exists in the system, it can use the RXAUD line if it wanrted to send a 'beep' to the audio PA. If PTT is subsequently pressed, then this new option must relinguish the line to the Scrambler.

7.2.1 BUS Activity

The signals appearing on the BUS for the above example are shown on the next page. Important response times are (assuming 9600 bps):

Option desires to 'beep' to 'beep' start:
  12 (6) packets
  12 msec
  (6) msec
Depressing PTT to radio key up:
  0 packets
  5 msec
Depressing PTT to 'beep' stop:
  same as above
Depressing PTT to Scrambler start:
  43 (36) packets
  45 msec
  (38) msec
Response to PTT drop:
  0 packets
  5 msec

| OPERATION | MESSAGE | FROM | TO | #PACKETS |
|---|---|---|---|---|
| RXAUD busy? | (READ REG SHORT) | O | R | (3) |
| | (REG SHORT IS) | R | O | (3) |
| Route RXAUD | WRITE REG SHORT | O | R | 4 |
| Commence 'beeping' | ACK | R | O | 2 |
| | | | | 12 (6) |
| | : | | | |
| PTT pressed | | (assume 5msec detect time) | | |
| Let BUS know radio keyed | UPDATE REG LONG | R | CO | 5 |
| | ACK | C | R | 2 |
| | RQ DISPLAY | R | C | 3 |
| | SHOW DISPLAY | C | R | 3 |
| Update display | DISPLAY IS | R | C | 8 |
| | ACK | C | R | 2 |
| Release RXAUD | WRITE REG SHORT | O | R | 4 |
| | ACK | R | O | 2 |
| Scrambler gets TXAUD | READ REG LONG | O | R | (3) |
| | REG LONG IS | R | O | (4) |
| | WRITE REG LONG | O | R | 5 |

-continued

| OPERATION | MESSAGE | FROM | TO | #PACKETS |
|---|---|---|---|---|
| | ACK | R | O | 2 |
| | | | | 43 (36) |
| | : | | | |
| PTT released | (assume 5msec detect time). | | | |
| Let BUS know radio dekey | UPDATE REG SHORT | R | CO | |
| | ACK | C | R | |
| | RQ DISPLAY | R | C | |
| | SHOW DISPLAY | C | R | |
| Turn Off TX indicator | DISPLAY IS | R | C | |
| | ACK | C | R | |
| | : | | | |

7.3 MVS-20

Since the MIC line is always on the BUS, a local store just consists of the MVS unit reading the MIC line, encoding it, and storing it away. A playback consists of routing RXAUD to the attenuator input (choosing to bypass the audio shaping), turning off the discriminator, and sending the decoded voice down the audio line. When done, the radio unmute is disabled and all lines are reverted to their normal position. For a remote message retrieval, TXAUD is routed to the splatter filter (bypassing the IDC), the MIC line is turned off, and the radio is keyed. When done, the MVS unit dekeys the radio.

7.3.1 BUS Activity

The signals that appear on the BUS for the above example are shown on the next page. Important response times are (assuming 9600 bps):

Button pressed to start of playback:
 19 (13) packets
 20 msec+5 msec=25 msec
 (14) msec+5 msec=(19) msec
Playback done to radio restored:
 4 packets
 4 msec
Retrieval command detected to radio key:
 19 (12) packets
 20 msec
 (13) msec
Transmission done to radio dekey:
 4 packets
 4 msec

| OPERATION | MESSAGE | FROM | TO | #PACKETS |
|---|---|---|---|---|
| Operator hits button | (assume 5 msec detect time) | | | |
| Let BUS know button down | UPDATE REG LONG | C | RO | 5 |
| | ACK | R | C | 2 |
| RXAUD busy? | (READ REG SHORT) | O | R | (3) |
| | (REG SHORT IS) | R | O | (3) |
| Route RXAUD | WRITE REG SHORT | O | R | 4 |
| | ACK | R | O | 2 |
| | | | | 19 (13) |
| Playback ends | : | | | |
| Restore RXAUD | WRITE REG SHORT | O | R | 4 |
| | ACK | R | O | |
| Message retrieval | : | | | |
| TXAUD busy? | (READ REG LONG) | O | R | (3) |
| | (REG LONG IS) | R | O | (4) |
| Route TXAUD, set TX ON | WRITE REG LONG | O | R | 5 |
| | ACK | R | O | 2 |
| Let BUS know radio keyed | UPDATE REG LONG | R | CO | 5 |
| Start message | ACK | C | R | 19 (12) |
| | RQ DISPLAY | R | C | |
| | SHOW DISPLAY | C | R | |
| Tx indicator | DISPLAY IS | R | C | |
| | ACK | C | R | |
| Message ends | : | | | |
| Dekey radio | BIT CLEAR | O | R | 4 |
| | ACK | R | O | |
| | RQ DISPLAY | R | C | |
| | SHOW DISPLAY | C | R | |
| Turn off TX indicator | DISPLAY IS | R | C | |
| | ACK | C | R | |
| | : | | | |

8.0 PROGRAMMABILITY

One of the highlights of LONGHORN is the capability of the user to configure has own system. In particular, a user can name modes (e.g. 'BEDFRD P'). If 8 characters are allowed for each mode, then it can be seen that a large amount of non-volatile storage is required (64 modes require 512 bytes). This storage is available in the radio 2k EEPROM (optionally 4k).

Another interesting feature is to allow international users to program their own display in their own language! No one likes international symbols (what is the international symbol for yelp anyway?). This takes even more memory (80 bytes per display, 25 displays require 2k bytes). This memory does not have to be intimately tied into the option or control head since since the normal display takes so long to change anyway. A separate option board can be used to house the memory. Whenever a SHOW DISPLAY is sent, this option board will respond with DISPLAY IS and send the appropriate display.

Programming these requires an alpha-numeric type programming 'option'. This will plug into the BUS and allows the user to update/change displays, names, compose messages, etc. Further details will be described in future issures of this document.

APPENDIX II

I. Introduction
II. Electrical Specification
III. Character Transmission
IV. Protocol
V. Messages
VI. Current Implementation
VII. Timing and Error Recovery

I. INTRODUCTION

This paper defines the serial bus used in the Lightning radio products. It is intended as a working document for the persons involved. The Lightning Serial Bus is optimized for a narrow set of requirements in the Lightning program. The tradeoffs were biased towards simplicity at the control head, minimum cost implementation, and bus efficiency. Multi-point communications were not required. and not addressed further.

Where necessary, this paper discussed the implementation details which affect the serial bus operation.

This document includes the work of Stephan Becher, Tom Brown, Tim Burke, John Taylor, Don Sloan, Werner Beck, and the STX program.

II. ELECTRICAL SPECIFICATION

The bus is composed of two unidirectional serial data lines and one common group reference. The serial data lines are defined as in or out with respect to the radio. The radio will receive Serial In, and transmit Serial Out. The control head will receive Serial Out from the bus, and transmit into Serial In on the bus. This convention avoids the problems of crossing a data out line into a data in line.

No control lines are provided for clocks, modem control, or device control.

| The electrical states on the serial bus are defined as: | | |
| --- | --- | --- |
| Logical 0 | "SPACE" | +5 VDC |
| Logical 1 | "MARK" | 0 VDC. |
| The transmitting device will output: | | |
| Logical 0 | +4.5 to +5.0 VDC | |
| Logical 1 | +0.0 to +0.5 VDC. | |
| The receiving device will accept: | | |
| Logical 0 | +4.0 to +5.0 VDC | |
| Logical 1 | +0.0 to +1.0 VDC. | |

This will provide 500 mv of noise margin and still allow flexibility in transmitter and receiver design.

III. CHARACTER TRANSMISSION

The asynchronous binary data format usually associated with EIA RS-232-C will be used.

The baud rate will be 1200 bits per second, although lower rates may later be provided in certain circumstances (modem. etc).

The character will consist of one start bit, seven data bits, one parity bit (ODD parity). and one stop bit. The character format in the order of transmission is defined as follows:

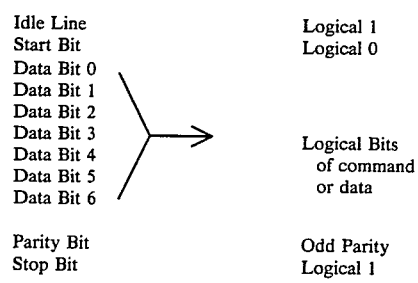

| Idle Line | Logical 1 |
| Start Bit | Logical 0 |
| Data Bit 0 | |
| Data Bit 1 | |
| Data Bit 2 | |
| Data Bit 3 | Logical Bits |
| Data Bit 4 | of command |
| Data Bit 5 | or data |
| Data Bit 6 | |
| Parity Bit | Odd Parity |
| Stop Bit | Logical 1 |

Odd parity means that the modulo-two sum of all of the data bits and the parity bit is odd (logical 1).

Although only one Stop Bit is defined, the Timing Section will define the minimum and maximum times, (which are equivalent to some number of stop bits) for successive characters within a single command, and for successive commands.

EXAMPLE

Transmit the "Write Numeric 5" command. Hexadecimal '45'.

| | | | ← order of transmission | | | | | | | |
| --- | --- | --- | --- | --- | --- | --- | --- | --- | --- | --- |
| 1 | 0 | 1 | 0 | 1 | 0 | 0 | 0 | 1 | 0 | 1 |
| I | S | D | D | D | D | D | D | D | P | S |
| d | t | 0 | 1 | 2 | 3 | 4 | 5 | 6 | a | t |
| l | a | | | | | | | | r | o |
| e | r | | | | | | | | i | p |
| | t | | | | | | | | t | |
| | | | | | | | | | y | |

The electrical levels associated with the above logical levels will be inverted.

IV. PROTOCOL

The serial bus is composed of two unidirectional serial lines. The bus itself is full duplex. The LCD-III (Slave) may talk and listen but not simultaneously, as its UART is done in software. The 6301 (Master) contains a full duplex UART, and will be responsible for recovery from system errors.

Messages are character oriented, with each character containing one parity bit for single bit error detection. The character is echoed back to the sending device (Master or Slave) as a handshake and error detection. A unit which receives no echo may retransmit the message. The Master, upon detecting an error condition, may optionally reconfigure the Slave.

Multicharacter messages will have each character echoed back as each is received. Partial retransmission of a multicharacter message is not permitted; the entire message must be repeated.

V. MESSAGES

MASTER TO SLAVE MESSAGES

DISCRETE OUTPUT

Turn discrete output (0–3) ON/OFF/FLASH.

Opcode contains address of discrete output (0–3) and whether to turn it off, on, or blink it at a (2 Hz, 50% duty cycle) rate.

Single byte command, echo response required.

Opcode format:

| d6 | d5 | d4 | d3   d2 | d1   d0 |
|----|----|----|---------|---------|
| 0  | 1  | 1  | (command) | (address) | where command  
00 = off  
01 = on  
10 = blink  
11 = unused, reserved

BEEP SHORT
BEEP LONG

The beep commands will cause the LCD-III to generate a tone of approximately 600 Hz for a timed duration.

The short beep will be about 21 msec, and the long beep will be about 560 msec.

The Master should not attempt any other commands during the beep, or the beep may be terminated prematurely.

Single byte commands, echo response required.
Command format:
Short Beep: H'3E' or
Long Beep: H'3F'

WRITE NUMERIC AT CURSOR
BLINK NUMERIC AT CURSOR

Write numeric data (0–9, underline, or blank) to 7 to 14 segment display.

The LCD-III Mask #2 will also include a special 'group call character', which is defined as the letter 'A', in the set of arguments for this command. Mask #2 will also change the underline character '_' to a dash '—'.

The Slave will use either a lookup table for a 7 segment display or a 14 segment display depending upon the address being written to. The Slave will automatically increment the cursor address after writing to the display position.

Single byte command, echo response required.

Opcode format:

| d6 | d5 | d4 | d3 | d2 | d1 | d0 |
|----|----|----|----|----|----|----|
| 1  | 0  | B  | C  | C  | C  | C  |
|    |    | Mask #1 |    |    | Mask #2 |    |
| where: | cccc | Displays | | | Displays | |
|    | 0000 | '0' | | | '0' | |
|    | 0001 | '1' | | | '1' | |
|    | 0010 | '2' | | | '2' | |
|    | 0011 | '3' | | | '3' | |
|    | 0100 | '4' | | | '4' | |
|    | 0101 | '5' | | | '5' | |
|    | 0110 | '6' | | | '6' | |
|    | 0111 | '7' | | | '7' | |
|    | 1000 | '8' | | | '8' | |
|    | 1001 | '9' | | | '9' | |
|    | 1010 | '—' Underline | | | 'A' | |
|    | 1011 | ' ' Blank | | | '—' Dash | |
|    | 1100 | (Prohibited) | | | ' ' Blank | |
|    | 1101 | (Prohibited) | | | (Prohibited) | |
|    | 1110 | (Prohibited) | | | (Prohibited) | |
|    | 1111 | (Prohibited) | | | (Prohibited) | | and where the 'B' bit is set to 1 to cause the character to blink at a 1Hz rate.

NOTE  The redundant command to Blink a ' ' (Blank) character will be reserved as a separate instruction (Advance Cursor).

ADVANCE CURSOR

Advance the cursor position without writing to the currently addressed numeric or annunciator position.

Single byte command, echo response required.
Opcode format = H'5B' (Mask #1 only!)
Opcode format = H'5C' (Mask #2 only!)

WRITE ALTERNATE SEGMENTS AT CURSOR
BLINK ALTERNATE SEGMENTS AT CURSOR
WRITE SEGMENTS AT CURSOR
BLINK SEGMENTS AT CURSOR

These four commands allow one to write direct segment information to the display, with the option to blink. They allow writing to either 7-segment or 14-segment locations, without creating a 3-byte command for the latter situation, or risking losing synchronization between Master and Slave.

To write to a 7-segment location, use WRITE SEGMENTS AT CURSOR or BLINK SEGMENTS AT CURSOR. The Slave will write the following data to the display location pointed to by the cursor, interpreting the data as direct segment information (segments gfedcba) for a 7-segment display. The cursor is automatically incremented after the display position is updated.

To write to a 14-segment location, use WRITE ALTERNATE SEGMENTS AT CURSOR, or BLINK ALTERNATE SEGMENTS AT CURSOR. The Slave will write the following data to the display location pointed to by the cursor, interpreting the data as direct segment information for the first half of a 14-segment display. The cursor is *not* incremented after the display position is updated, so that another command (WRITE SEGMENTS AT CURSOR or BLINK SEGMENTS AT CURSOR) may be issued to write to the second half of the display, and then increment the cursor.

Two byte commands. Second byte contains segment data. Echo of each byte is sent after each byte is received.
Command Format:
Write Alternate Segments:
  Opcode = H'4D'.
  Data (gfedcba) = H'0-7F'
Blink Alternate Segments:
  Opcode = H'5D'.
  Data (gfedcba) = H'0-7F'
Write Segments:
  Opcode = H'4E'.
  Data (gfedcba) = H'0-7F'
Blink Segments:
  Opcode = H'5E'.
  Data (gfedcba) = H'0-7F'

WRITE ALPHA AT CURSOR
BLINK ALPHA AT CURSOR

Translate, write data (Hex 00-28 for Mask #1, Hex 00-29 for Mask #2) to one 7- or 14-segment display location. If a 7-segment location is written to, the LCD-III will use a unique lookup table and approximate the character as closely as possible. (Some 7-segment characters are not very recognizable). The cursor is automatically incremented after the display position is updated.

Two byte command. The second byte contains data (Hex 00-28 for Mask #1. Hex 00-29 for Mask #2) to be translated into the characters shown below.

Echo of each byte is sent after each is received.
Command Format:
  Write Alpha at Cursor:
    Opcode=H'4F'
    Character number=H'0-28' (Mask #1) or H'0-29' (Mask #2)
  Blink Alpha at Cursor:
    Opcode=H'5F'
    Character number=H'0-28' (Mask #1) or H'0-29' (Mask #2)

| Character Number (Hex) | Mask #1 Display | Mask #2 Display |
|---|---|---|
| 00 | 0 | 0 |
| 01 | 1 | 1 |
| 02 | 2 | 2 |
| 03 | 3 | 3 |
| 04 | 4 | 4 |
| 05 | 5 | 5 |
| 06 | 6 | 6 |
| 07 | 7 | 7 |
| 08 | 8 | 8 |
| 09 | 9 | 9 |
| 0A | _ (Underline) | A (A=group call) |
| 0B | ' ' (Blank) | '-' (Dash) |
| 0C | A | ' ' (Blank) |
| 0D | B | A |
| 0E | C | B |
| 0F | D | C |

| Character Number (Hex) | Mask #1 Display | Mask #2 Display |
|---|---|---|
| 10 | E | D |
| 11 | F | E |
| 12 | G | F |
| 13 | H | G |
| 14 | I | H |
| 15 | J | I |
| 16 | K | J |
| 17 | L | K |
| 18 | M | L |
| 19 | N | M |
| 1A | O | N |
| 1B | P | O |
| 1C | Q | P |
| 1D | R | Q |
| 1E | S | R |
| 1F | T | S |
| 20 | U | T |
| 21 | V | U |
| 22 | W | V |
| 23 | X | W |
| 24 | Y | X |
| 25 | Z | Y |
| 26 | ? | Z |
| 27 | + | ? |
| 28 | * | + |
| 29 | unused | * |
| 2A-7F | unused | unused |

SET CURSOR

Set cursor for numeric or annunciators to location (0-7). Location 0 is at the left side of the display and location 7 is at the right side. Subsequent 'Write Numeric at Cursor', 'Blink Numeric at Cursor', or 'Annunciator Off/On/Blink at Cursor' commands will increment the cursor location after the current display location is affected. The cursor will not be incremented modulo-8, so that more than 8 display locations or annunciator locations may be accessed even though the cursor may only be directly set to one of 8 locations.

Single byte command, echo response required.

Opcode: format

| d6 | d5 | d4 | d3 | d2 | d1 | d0 |
|---|---|---|---|---|---|---|
| 1 | 1 | 0 | 0 | L | L | L | where: LLL = location 0 through 7.

ANNUNCIATOR OFF/ON/BLINK AT CURSOR

Turn the annunciator at the cursor position off/on/blink. The Slave will automatically increment the cursor address after writing to the display position.

Annunciators 0-7 are visual indicators on the LCD display, numbered from left to right. Default state for annunciators 0-7 on LCD-III reset is 'OFF'.

Annunciators 8-11 are enabling controls for the discrete inputs. If the 'annunciator' corresponding to a discrete input is on, then a change in that discrete input will cause the serial bus command to be sent. If the 'annunciator' is off, the input change will not produce a serial bus command. Default state for annunciators 8-11 is 'OFF', disabling all discrete inputs. The LCD-III will treat to a command to blink an annunciator 8-11 as a null command.

Annunciator 12 is the backlight control. Default state on LCD-III reset is 'ON'. The LCD-III will treat a command to blink annunciator 12 as a null command.

Single byte command, echo response required.

Opcode format:

| d6 | d5 | d4 | d3 | d2 | d1 | d0 | |
|---|---|---|---|---|---|---|---|
| 1 | 1 | 0 | 1 | 1 | 0 | 0 | = Unused.reserved |
| 1 | 1 | 0 | 1 | 1 | 0 | 1 | = OFF |
| 1 | 1 | 0 | 1 | 1 | 1 | 0 | = ON |
| 1 | 1 | 0 | 1 | 1 | 1 | 1 | = BLINK |

READ CODEPLUG

Read 4 bytes from codeplug at segment address (0-31).

The codeplug is divided into segments of 4 bytes (8 nibbles) each. A 256-bit codeplug has 8 segments, and a 1K-bit codeplug has 32 segments. (The codeplug used will be determined before the LCD-III mask is released). The Master will read or write to one complete 4-byte segment.

The 5-bit segment address will be contained in a byte which shares the opcode space with the (Slave to Master) Keycode commands.

The 4-bit (nibble) data will be contained in bytes which share the opcode space with the (Slave to Master) Discrete Inputs commands.

Command Format:
  Opcode: H'70'
  Seg. address (0-31): H'00-1F'

Response is echo of each byte after each is received, followed by the 8 nibbles of data, mapped into the opcode space of the Discrete Input commands.

Nibble 0: H'20-2F'
Nibble 1: H'20-2F'
Nibble 2: H'20-2F'
Nibble 3: H'20-2F'
Nibble 4: H'20-2F'
Nibble 5: H'20-2F'
Nibble 6: H'20-2F'
Nibble 7: H'20-2F'

Each nibble of data sent to the Master will be echoed back as it is received. A NAK or no response from the Master for any byte will terminate the Read Codeplug command, and the Master will be responsible for corrective action. (This is necessary because the data nibbles are not sequentially tagged, and a retransmission could be interpreted as the next byte of data).

WRITE CODEPLUG

Write 4 bytes to codeplug at segment address (0–31).
The codeplug is divided into segments of 4 bytes (8 nibbles) each. A 256-bit codeplug has 8 segments, and a 1K-bit codeplug has 32 segments. (The codeplug used will be determined before the LCD-III mask is released). The Master will read or write to one complete 4-byte segment.

The 5-bit segment address will be contained in a byte which shares the opcode space with the (Slave to Master) Keycode commands.

The 4-bit (nibble) data will be contained in bytes which share the opcode space with the (Slave to Master) Discrete Inputs commands.

Command Format:
Opcode: H'71'
Seg. address (0–31): H'00-1F'
Nibble 0: H'20-2F'
Nibble 1: H'20-2F'
Nibble 2: H'20-2F'
Nibble 3: H'20-2F'
Nibble 4: H'20-2F'
Nibble 5: H'20-2F'
Nibble 6: H'20-2F'
Nibble 7: H'20-2F'

The response wil be an echo of each byte after each is received. A NAK or no response from the Slave will terminate the Write Codeplug command, and the Master will be responsible for corrective action.

INHIBIT SLAVE ORIGINATE

Command will inhibit the Slave from originating any data packets. The Master then would have to poll the Slave with the Send Keycode or Send Discrete Input commands. The Slave will be inhibited until a power on reset, or a Reset command, or an Enable Slave Originate is received. If the Slave is inhibited, then retransmission by the Slave is also inhibited.
Single byte command, echo response required.
Opcode format=H'74'.

ENABLE SLAVE ORIGINATE

Command will re-enable the Slave to originate asynchronous data, such as Kecode, or Discrete Inputs.
Single byte command, echo response required.
Opcode format=H'75'.

SEND KEYCODE

Send current matrix key closure (one closure of 4×6 matrix, or equivalent, encoded into Key 0=none, or key 1–31 maximum). After the Slave acknowledges the command, it will initiate a Slave-to-Master KEYCODE command sequence just as if it independently determined that a key matrix change had occurred. However, if the Slave is inhibited it will not retransmit should the KEYCODE command not be echoed back properly, and the Master should re-request the Keycode if desired. The Slave will NAK an erroneous echo whether or not it is inhibited.
Single byte command, echo response required.
Opcode format=H'76'.

SEND DISCRETE INPUTS

Send discrete, non-matrixed inputs (such as PTT, HUB). The 'discrete inputs' allow inputs which are not mutually exclusive. After the Slave acknowledges the command, it will initiate a Slave-to-Master DISCRETE INPUTS command sequence just as if it independently determined that a change occured in the non-matrixed input lines. As in the case of SEND KEYCODE, if the Slave is inhibited, retransmission will be disabled for the resulting DISCRETE INPUTS command from the Slave. The Slave will NAK an erroneous echo whether or not it is inhibited.
Single byte command, echo response required.
Opcode format=H'77'.

SEND NUMERICS

Clear all display digits (7 and/or 14 seg). The LCD-III automatically leaves the cursor at position 0 after this command.
Single byte command, echo response required.
Opcode format=H'78'.

CLEAR ANNUNCIATORS

Clear all of the LCD annunciators. The LCD-III automatically leaves the cursor at position 0 after this command.
Single byte command, echo response required.
Opcode format=H'79'.

CLEAR DISCRETE OUTPUTS

Clear all of the discrete outputs (LED's).
Single byte command, echo response required.
Opcode format=H'7A'.

RESET

Clear display, annunciators, discrete outputs. Abort any commands. The LCD-III will act as if it received a hardware reset.
Single byte command, echo response required.
Opcode format=H'7E'.

NAK-ERROR

Negative Acknowledge.

This single byte command is only sent by the originator of a command to abort an erroneous command. The recipient of a command and then a NAK will abort the command, perform the no-response action, and allow the originator to retransmit.
Opcode format=H'7F'.

SLAVE TO MASTER MESSAGES
KEYCODE

Binary code of one key pressed on the matrix.

The matrix of up to 31 keys may be physically split into any subsets, but no more than one may be pressed at the same time. If more than one key is pressed, only one will be recognized (the one scanned first by the processor). Up to 31 keys (max) are encoded into 5 bits (00, or $01-$1F). KEYCODE '00' represents no keys pressed.

A KEYCODE command will be asynchronously initiated by the Slave when a matrixed key is pressed unless the Slave generation has been inhibited by the Master.

In Mask #1, KEYCODE 00 will be transmitted asynchronously by the Slave when a key is released. In Mask #2, KEYCODE 00 will not be transmitted upon release of a key, but may be transmitted if the Slave is polled by the Master with a SEND KEYCODE command.

Single byte command, echo response required.
Opcode Format:
No Key Pressed=H'00' or
Key 1 Pressed=H'01'
⋮
Key 31 Pressed=H'1F'

DISCRETE INPUTS

Unencoded (non-matrixed) discrete inputs.

Up to four inputs which are not mutually exclusive eg., PTT, HUB may be sent from Slave to Master.

A DISCRETE INPUTS command will be asynchronously initiated by the Slave when a non-matrixed input change is detected, unless the Slave generation has been inhibited by the Master. The DISCRETE INPUTS command may be enabled or disabled for individual inputs by turning on or off 'annunciators' associated with each input.

Although the inputs are general purpose, in the Lightning mobile In0 is connected to PTT, and In1 is connected to HUB.

Single byte command, echo response required.

Opcode format:

| d6 | d5 | d4 | d3 | d2 | d1 | d0 |
|----|----|----|----|----|----|----|
| 0  | 1  | 0  | In3 | In2 | In1 | In0 |

CODEPLUG OUT

Indicates that the codeplug was removed.

This command will be asynchronously intiated by the Slave when the codeplug is removed, unless the Slave generation has been inhibited by the Master.

Single byte command, echo response required.
Opcode format=H'72'.

CODEPLUG IN

Indicates that the codeplug was inserted.

This command will be asynchronously intiated by the Slave when the codeplug is inserted, unless the Slave generation has been inhibited by the Master.

Single byte command, echo response required.
Opcode format=H'73'.

EXTERNAL PROGRAMMER MODE

This command will be initiated by the external programmer, and will be transparently passed through the LCD-III to the Master. The Master may then enter the EEPROM programming mode. (When the programmer is removed, the LCD-III may send the Reset command to the Master).

This command will be sent by the (Slave) external programmer to the Master regardless of whether or not the (Slave) LCD-III in the control head was inhibited by the Master.

Single byte command, echo response required.
Opcode format=H'7D'.

RESET

This command, when sent from the Slave to the Master, will inform the Master that the Slave was reset. This will allow the Master to reconfigure the Slave if some spurious signal caused a hardware reset.

This command will be sent by the Slave to the Master regardless of whether or not the Slave has inhibited by the Master prior to the reset occurance.

Single byte command, echo response required.
Opcode format=H'7E'.

NAK-ERROR

Negative Acknowledge.

This single byte command is only sent by the originator of a command to abort an erroneous command. The recipient of a command and then a NAK will abort the command, perform the no-response action, and allow the originator to retransmit.
Opcode format=H'7F'.

| OPCODE MAP — — MASTER TO SLAVE — — LCD-III MASK #1 ONLY | | | | | | | | |
|---|---|---|---|---|---|---|---|---|
| | MSD | | | | | | | |
| LSD | 0 | 1 | 2 | 3 | 4 | 5 | 6 | 7 |
| 0 | | | | | Out 0 OFF | Write 0 | Blink 0 | Cursor 0 | Read Cdplg |
| 1 | | | | | Out 1 OFF | Write 1 | Blink 1 | Cursor 1 | Write Cdplg |
| 2 | | | | | Out 2 OFF | Write 2 | Blink 2 | Cursor 2 | |
| 3 | | | | | Out 3 | Write | Blink | Cursor | |

-continued

| | | | | | |
|---|---|---|---|---|---|
| | | OFF | 3 | 3 | 3 | |
| 4 | | Out 0 | Write | Blink | Cursor | Inhib |
| | | ON | 4 | 4 | 4 | Slave |
| 5 | | Out 1 | Write | Blink | Cursor | Enable |
| | | ON | 5 | 5 | 5 | Slave |
| 6 | | Out 2 | Write | Blink | Cursor | Send |
| | | ON | 6 | 6 | 6 | Keycod |
| 7 | | Out 3 | Write | Blink | Cursor | Send |
| | | ON | 7 | 7 | 7 | Inputs |
| 8 | | Out 0 | Write | Blink | | Clear |
| | | Blink | 8 | 8 | | Numer |
| 9 | | Out 1 | Write | Blink | | Clear |
| | | Blink | 9 | 9 | | Annun |
| A | | Out 2 | Write | Blink | | Clear |
| | | Blink | '—' | '—' | | Outs |
| B | | Out 3 | Write | Adv. | | |
| | | Blink | ' ' | Cursor | | |
| C | | | | | | |
| D | | | Write | Blink | Annun | |
| | | | AltSeg | AltSeg | Off | |
| E | | Beep | Write | Blink | Annun | Reset |
| | | Short | Segmnt | Segmnt | On | |
| F | | Beep | Write | Blink | Annun | NAK - |
| | | Long | Alpha | Alpha | Blink | Error |

<codeplug adr> < data >   ← segment or alpha data for display →

OPCODE MAP — — SLAVE TO MASTER — — LCD-III MASK #1 ONLY

| | | | MSD | | | | | |
|---|---|---|---|---|---|---|---|---|
| LSD | 0 | 1 | 2 | 3 | 4 | 5 | 6 | 7 |
| 0 | Key 0 = none | Key 16 | Inputs 0000 | | | | | |
| 1 | Key 1 | Key 17 | Inputs 0001 | | | | | |
| 2 | Key 2 | Key 18 | Inputs 0010 | | | | | Cdplg Out |
| 3 | Key 3 | Key 19 | Inputs 0011 | | | | | Cdplg In |
| 4 | Key 4 | Key 20 | Inputs 0100 | | | | | |
| 5 | Key 5 | Key 21 | Inputs 0101 | | | | | |
| 6 | Key 6 | Key 22 | Inputs 0110 | | | | | |
| 7 | Key 7 | Key 23 | Inputs 0111 | | | | | |
| 8 | Key 8 | Key 24 | Inputs 1000 | | | | | |
| 9 | Key 9 | Key 25 | Inputs 1001 | | | | | |
| A | Key 10 | Key 26 | Inputs 1010 | | | | | |
| B | Key 11 | Key 27 | Inputs 1011 | | | | | |
| C | Key 12 | Key 28 | Inputs 1100 | | | | | |
| D | Key 13 | Key 29 | Inputs 1101 | | | | | Extern Proger Reset |
| E | Key 14 | Key 30 | Inputs 1110 | | | | | |
| F | Key 15 | Key 31 | Inputs 1111 | | | | | NAK - Error |

<codeplug adr> < data >

COMPLETE OPCODE MAP — — LCD-III MASK #1 ONLY

| | | | MSD | | | | | |
|---|---|---|---|---|---|---|---|---|
| LSD | 0 | 1 | 2 | 3 | 4 | 5 | 6 | 7 |
| 0 | Key 0 = none | Key 16 | Inputs 0000 | Out 0 OFF | Write 0 | Blink 0 | Cursor 0 | Read Cdplg |
| 1 | Key 1 | Key 17 | Inputs 0001 | Out 1 OFF | Write 1 | Blink 1 | Cursor 1 | Write Cdplg |
| 2 | Key 2 | Key 18 | Inputs 0010 | Out 2 OFF | Write 2 | Blink 2 | Cursor 2 | Cdplg Out |
| 3 | Key 3 | Key 19 | Inputs 0011 | Out 3 OFF | Write 3 | Blink 3 | Cursor 3 | Cdplg In |
| 4 | Key 4 | Key 20 | Inputs 0100 | Out 0 ON | Write 4 | Blink 4 | Cursor 4 | Inhib Slave |
| 5 | Key 5 | Key 21 | Inputs 0101 | Out 1 ON | Write 5 | Blink 5 | Cursor 5 | Enable Slave |
| 6 | Key 6 | Key 22 | Inputs 0110 | Out 2 ON | Write 6 | Blink 6 | Cursor 6 | Send Keycod |

-continued

| | | | | | | | | |
|---|---|---|---|---|---|---|---|---|
| 7 | Key 7 | Key 23 | Inputs 0111 | Out 3 ON | Write 7 | Blink 7 | Cursor 7 | Send Inputs |
| 8 | Key 8 | Key 24 | Inputs 1000 | Out 0 Blink | Write 8 | Blink 8 | U | Clear Numer |
| 9 | Key 9 | Key 25 | Inputs 1001 | Out 1 Blink | Write 9 | Blink 9 | U | Clear Annun |
| A | Key 10 | Key 26 | Inputs 1010 | Out 2 Blink | Write '—' | Blink '—' | U | Clear Outs |
| B | Key 11 | Key 27 | Inputs 1011 | Out 3 Blink | Write ' ' | Adv. Cursor | U | U |
| C | Key 12 | Key 28 | Inputs 1100 | U | U | U | U | U |
| D | Key 13 | Key 29 | Inputs 1101 | U | Write AltSeg | Blink AltSeg | Annun Off | Extern Proger |
| E | Key 14 | Key 30 | Inputs 1110 | Beep Short | Write Segmnt | Blink Segmnt | Annun On | Reset |
| F | Key 15 | Key 31 | Inputs 1111 | Beep Long | Write Alpha | Blink Alpha | Annun Blink | NAK - Error |
| <codeplug adr> | < data > | | ← segment or alpha data for display → | | | | | |

OPCODE MAP — — MASTER TO SLAVE — — LCD-III MASK #2 ONLY

| LSD | 0 | 1 | 2 | 3 | 4 | 5 | 6 | 7 |
|---|---|---|---|---|---|---|---|---|
| | | | | | | MSD | | |
| 0 | | | | Out 0 OFF | Write 0 | Blink 0 | Cursor 0 | Read Cdplg |
| 1 | | | | Out 1 OFF | Write 1 | Blink 1 | Cursor 1 | Write Cdplg |
| 2 | | | | Out 2 OFF | Write 2 | Blink 2 | Cursor 2 | |
| 3 | | | | Out 3 OFF | Write 3 | Blink 3 | Cursor 3 | |
| 4 | | | | Out 0 ON | Write 4 | Blink 4 | Cursor 4 | Inhib Slave |
| 5 | | | | Out 1 ON | Write 5 | Blink 5 | Cursor 5 | Enable Slave |
| 6 | | | | Out 2 ON | Write 6 | Blink 6 | Cursor 6 | Send Keycod |
| 7 | | | | Out 3 ON | Write 7 | Blink 7 | Cursor 7 | Send Inputs |
| 8 | | | | Out 0 Blink | Write 8 | Blink 8 | | Clear Numer |
| 9 | | | | Out 1 Blink | Write 9 | Blink 9 | | Clear Annun |
| A | | | | Out 2 Blink | Write A | Blink A | | Clear Outs |
| B | | | | Out 3 Blink | Write '—' | Blink '—' | | |
| C | | | | | Write ' ' | Adv. Cursor | | |
| D | | | | | Write AltSeg | Blink AltSeg | Annun Off | |
| E | | | | Beep Short | Write Segmnt | Blink Segmnt | Annun On | Reset |
| F | | | | Beep Long | Write Alpha | Blink Alpha | Annun Blink | NAK - Error |
| <codeplug adr> | < data > | | ← segment or alpha data for display → | | | | | |

OPCODE MAP — — SLAVE TO MASTER — — LCD-III MASK #2 ONLY

| LSD | 0 | 1 | 2 | 3 | 4 | 5 | 6 | 7 |
|---|---|---|---|---|---|---|---|---|
| | | | | | MSD | | | |
| 0 | Key 0 = none | Key 16 | Inputs 0000 | | | | | |
| 1 | Key 1 | Key 17 | Inputs 0001 | | | | | |
| 2 | Key 2 | Key 18 | Inputs 0010 | | | | | Cdplg Out |
| 3 | Key 3 | Key 19 | Inputs 0011 | | | | | Cdplg In |
| 4 | Key 4 | Key 20 | Inputs 0100 | | | | | |
| 5 | Key 5 | Key 21 | Inputs 0101 | | | | | |
| 6 | Key 6 | Key 22 | Inputs 0110 | | | | | |
| 7 | Key 7 | Key 23 | Inputs 0111 | | | | | |
| 8 | Key 8 | Key 24 | Inputs 1000 | | | | | |
| 9 | Key 9 | Key 25 | Inputs | | | | | |

-continued

| | | | | | | |
|---|---|---|---|---|---|---|
| A | Key 10 | Key 26 | Inputs 1001 | | | |
| B | Key 11 | Key 27 | Inputs 1010 | | | |
| C | Key 12 | Key 28 | Inputs 1011 | | | |
| D | Key 13 | Key 29 | Inputs 1100 | | | Extern Proger |
| E | Key 14 | Key 30 | Inputs 1101 | | | Reset |
| F | Key 15 | Key 31 | Inputs 1110 | | | |
| | | | Inputs 1111 | | | NAK - Error |
| <codeplug adr> < data > | | | | | | |

COMPLETE OPCODE MAP — — LCD-III MASK #2 ONLY

| LSD | MSD 0 | 1 | 2 | 3 | 4 | 5 | 6 | 7 |
|---|---|---|---|---|---|---|---|---|
| 0 | Key 0 = none | Key 16 | Inputs 0000 | Out 0 OFF | Write 0 | Blink 0 | Cursor 0 | Read Cdplg |
| 1 | Key 1 | Key 17 | Inputs 0001 | Out 1 OFF | Write 1 | Blink 1 | Cursor 1 | Write Cdplg |
| 2 | Key 2 | Key 18 | Inputs 0010 | Out 2 OFF | Write 2 | Blink 2 | Cursor 2 | Cdplg Out |
| 3 | Key 3 | Key 19 | Inputs 0011 | Out 3 OFF | Write 3 | Blink 3 | Cursor 3 | Cdplg In |
| 4 | Key 4 | Key 20 | Inputs 0100 | Out 0 ON | Write 4 | Blink 4 | Cursor 4 | Inhib Slave |
| 5 | Key 5 | Key 21 | Inputs 0101 | Out 1 ON | Write 5 | Blink 5 | Cursor 5 | Enable Slave |
| 6 | Key 6 | Key 22 | Inputs 0110 | Out 2 ON | Write 6 | Blink 6 | Cursor 6 | Send Keycod |
| 7 | Key 7 | Key 23 | Inputs 0111 | Out 3 ON | Write 7 | Blink 7 | Cursor 7 | Send Inputs |
| 8 | Key 8 | Key 24 | Inputs 1000 | Out 0 Blink | Write 8 | Blink 8 | U | Clear Numer |
| 9 | Key 9 | Key 25 | Inputs 1001 | Out 1 Blink | Write 9 | Blink 9 | U | Clear Annun |
| A | Key 10 | Key 26 | Inputs 1010 | Out 2 Blink | Write A | Blink A | U | Clear Outs |
| B | Key 11 | Key 27 | Inputs 1011 | Out 3 Blink | Write '—' | Blink '—' | U | U |
| C | Key 12 | Key 28 | Inputs 1100 | U | Write ' ' | Adv. Cursor | U | U |
| D | Key 13 | Key 29 | Inputs 1101 | U | Write AltSeg | Blink AltSeg | Annun Off | Extern Proger Reset |
| E | Key 14 | Key 30 | Inputs 1110 | Beep Short | Write Segmnt | Blink Segmnt | Annun On | Reset |
| F | Key 15 | Key 31 | Inputs 1111 | Beep Long | Write Alpha | Blink Alpha | Annun Blink | NAK - Error |
| <codeplug adr> < data > | | | | | | | | |

← segment or alpha data for display →

VI. CURRENT IMPLEMENTATION

LCD DISPLAY:
1. Eight character locations.
2. Left 4 locations are 14 segments, right 4 locations are 7 segments.
3. Display has 8 annunciators positions.

KEYPAD:
1. Allows for up to 31 matrixed switches, in either a control head or handset configuration.
2. Current control head has 3×4 keypad and 8 other popple switches, all addressed within one matrix.
3. Proposed handset may have 3×7 numeric and function matrix.
4. Only one key closure may be read at one time.

OTHER INPUTS:
1. Multiple closures (non-matrixed) of special inputs. Only 2 are presently provided (PTT, Hangup).

OTHER OUTPUTS:
1. Control of four LED's with independent on, off, and blink capability.
2. Backlight control.
3. Small set of tones generated by LCD-III, for Keypress application.

EXTERNAL PROGRAMMER:
1. Independent of normal operation.
2. LCD-III detects presence and enters transparent mode.

EXTERNAL CODEPLUG:
1. Power control and chip enable by LCD-III.
2. Data In/Out and Clock provided.
3. Exact EEPROM device, timing, and contents are TBD.

OPERATIONAL NOTES

1. POWER UP OR HARDWARE RESET
   A. Configure all ports
   B. LED's off
   C. Backlight on
   D. PTT, HUB inputs disabled
   E. Spare 2 inputs disabled
   F. Clear all LCD display
   G. Send 'Reset' and wait echo H. If codeplug in, send command
2. RECEIVING SOFTWARE RESET
  A. Echo 'Reset'
  B. Perform power on reset sequence in (1) including sending and receiving 'Reset'
3. SERIALIZATION OF PTT, HUB
  A. Discrete inputs are d3−0=nc,nc,HUB,PTT
  B. Annunciator commands may enable or disable any of the 4 inputs
  C. Annunciator positions:

| | | |
|---|---|---|
| 0–7 | on LCD glass | (Default OFF) |
| 8 | D0=PTT | (Default OFF=Disabled) |
| 9 | D1=HUB | (Default OFF=Disabled) |
| 10 | D2=nc | (Default OFF=Disabled) |
| 11 | D3=nc | (Default OFF=Disabled) |
| 12 | Backlight | (Default OFF) |

D. Mobile is configured properly on power up
  E. Base needing serial PTT, HUB commands would turn on annunciators 8,9 to enable inputs.
4. LCD3 BLIND TIME TO MATRIX AND INPUT CHANGES
  A. Blind during TX of byte (8.3 ms)
  B. Blind during RX of byte (8.3 ms)
  C. Blind whenever bus not idle.
  d. Input or matrix changes detected at all other times
  E. This blind time should be negligible compared to operator reaction times
5. QUEUEING OF LCD3 COMMANDS
  A. Does not queue commands during retrans of one command
  B. Does not queue commands while disabled.
  C. If disabled for long time, while many keys hit, and then enabled, only input changes after enabling would be sent.
6. LED-III MASK BUGS AND CHANGES
  A. Mask #1 Dated 6/9/84.
  B. BUG: Mask #1 will start an infinite sequence with the radio of sending and receiving 'Reset' commands and echoes if it is put into the programming mode (transparent) and then the programmer is removed. This will be corrected in mask #2. With mask #1. the radio should be turned off and on after programming.
  C. BUG: Mask #1 allows a received serial byte to interrupt the transmission of a byte. This will be corrected in Mask #2.
  D. CHANGE: Mask #1 displays an Underline (_). Mask #2 will change this to a Dash (—).
  E. CHANGE: In Mask #2 the letter 'A' will be added to the set of characters in the single byte 'Write Numeric' command. The letter 'A' will also be located in the full alpha-numeric table used by the two byte 'Write Alpha' command.
  F. CHANGE: In Mask #2 the LCD-3 will be responsible for detecting bus collisions instead of the 6301. This document will reflect the Mask #2 operation. Refer to the July 13, 1984 document if necessary to use the Mask #1 collision logic.

TIMING ASSUMPTIONS

1. The 6301 during Select V decode has a 'recognition time' or worst case servicing time of presently 16 msec. If this can later be improved upon, the timing may change (depending on LCD-III mask opportunities).
2. The 6301 has a start bit ambiguity on transmit of 1–2 bit times.
3. The 6301 detects a serial input byte only after the byte is complete, while the LCD-III detects the start bit of a serial input. The times that are shown are adjusted to reflect the time of the receive 'event' for each.
4. The execution times for the LCD-III may be changed slightly. These must be finalized before radio processor masks are released.

| Actual Execution Time by LCD-III | |
|---|---|
| Set Cursor | 1 ms |
| Write Numeric | 3 ms |
| Write Alpha | 3 ms |
| Write Segment | 4 ms |
| Write Alt Segment | 4 ms |
| Annunciator On/Off/Blink | 2 ms |
| Discrete Out On/Off/Blink | 1 ms |
| Beep Short | 23 ms |
| Beep Long | 570 ms |
| Enable/Inhibit | 1 ms |
| Clear Numerics | 20 ms |
| Clear Annunciators | 16 ms |
| Clear Outs | 1 ms |
| Reset | 30 ms |

| | TIMED BY 6301 | | TIMED BY LCD-III | |
|---|---|---|---|---|
| TIMING PARAMETER | MIN | MAX | MIN | MAX |
| tRT receive-to-transmit | 0 | 16 ms | 2b | 4b |
| tWNAK wait-for-NAK | 16b | 18b | 16ms+2b | 16ms+4b |
| tRETRANS retransmission | 16b | 18b | 16ms+2b | 16ms+4b |
| tTA turnaround | 24ms | — | 24ms | — |
| tFUNC function wait | | | | |
| Set Cursor | 21 ms | — | — | — |
| Write Numeric | 23 ms | — | — | — |
| Write Alpha | 23 ms | — | — | — |
| Write Segment | 24 ms | — | — | — |
| Write Alt Segment | 24 ms | — | — | — |
| Annunciator On/Off/Blink | 22 ms | — | — | — |
| Discrete Out On/Off/Blink | 21 ms | — | — | — |
| Beep Short | 43 ms | — | — | — |
| Beep Long | 590 ms | — | — | — |
| Enable/Inhibit | 21 ms | — | — | — |
| Clear Numerics | 40 ms | — | — | — |

| TIMING PARAMETER | TIMED BY 6301 | | TIMED BY LCD-III | |
|---|---|---|---|---|
| | MIN | MAX | MIN | MAX |
| Clear Annunciators | 36 ms | — | — | — |
| Clear Outs | 21 ms | — | — | — |
| Reset | 50 ms | — | — | — |
| Keycode (any) | — | — | 24b | — |
| Inputs (any) | — | — | 24b | — |
| Codeplug In/Out | — | — | 24b | — |
| Reset | — | — | 24b | — |

NOTES:
1. 'b' is one bit time or 0.833 msec
2. The 6301 times include the packet time to allow RDRF to be set, where necessary.
3. The function times timed by the 6301 were increased from the previous document to include the tWNAK time as timed by the LCD-III.

BUS ERROR RECOVERY

1. Timing diagrams show use of 'NAK' and 'no response' for normal bus error detection. The recipient uses 'no response' to indicate a bus error, and the originator uses 'NAK' to cancel a command.

2. The LCD-III must 'check' for incoming data before sending, ie., its receive interrupt must be enabled until just before a transmission is started. If a start bit is detected, the transmission should be suspended until the receive operation has been serviced.

3. The 6301 must check the RDRF just before transmitting. If true, the transmission should be suspended until after the receive operation has been serviced.

4. The 6301 will treat all undesired responses to its commands as bus errors, never as collisions.

6. Because of the timing defined, a collision may not occur on the subsequent bytes of multibyte commands, or an responses to commands.

LCD-III BUS ERROR OR COLLISION OPERATION

1. Check for RX start bit before TX.

2. If RX start bit, suspend TX sequence and service RX.

3. If no RX start bit, LCD3 may send TX byte.

4. LCD3 will leave the H/W interrupt on the RX line enabled during TX to detect collisions in which there is an actual overlap in time of TX and RX bytes.

5. If the LCD3 sends a byte, is not interrupted during TX, and receives a byte which is neither a valid echo nor a valid NAK, it will assume that it is due to a bus error and will try to NAK and retransmit.

6. After the LCD3 sends a byte, it will time on the 'retrans' time.

7. If the retrans timer times out before a start bit is detected, the LCD3 will retransmit.

8. If a proper echo is received, the TX process is complete.

9. If the LCD3 is H/W interrupted during TX, it will assume that a bus collision is occuring. It will abort the TX byte in progress, assert the TX line for 10 msec to cause a BREAK detect in the 6301 (Frame Error), and then back off the bus to allow the 6301 to be serviced first.

10. If after transmitting a command, the LCD3 receives a valid 'NAK' during its retrans time, it assumes that a non-overlapping collision is in progress. It will perform the 'No-response' action to the NAK, and back off the bus to allow the 6301 to be serviced first.

11. If the LCD3 detects a collision by the H/W abort or NAK reception, it will save its command until the 6301 is serviced or the turnaround time is complete and then attempt its command again.

12. If a H/W abort of an LCD3 TX was due to noise, there will be no NAK and retrans by the 6301 after the LCD3 does the Break and back off the bus process. The LCD3 will then time out its bus idle condition and retransmit.

13. In a non-overlapping collision, the 6301 could receive the original LCD3 byte as well as a NAK before it can service the former. This will cause an Overrun Error, which it should NAK, time on wait-NAK, and then retransmit.

6301 BUS ERROR OR COLLISION OPERATION

1. Check RDRF before TX.

2. If RDRF, suspend TX sequence and service RX.

3. If no RDRF, bus is (apparently) clear to TX byte.

4. RX will still function properly during TX.

5. A collision may be overlapping or non-overlapping as far as the timing of the bytes in the two directions is concerned.

6. In a non-overlapping collision, the 6301 will receive the LCD3 byte properly unless another bus error also occurs.

7. In an overlapping collision, the 6301 may receive a Frame Error due to the Break generation by the LCD3.

8. If the 6301 receives anything other than a proper echo, including frame error, parity error, valid NAK, valid S-M command, etc., it should NAK, time wait-for-NAK to ensure that the LCD3 is quiet, and then retransmit. It is the responsibility of the LCD3 to detect collisions by either the H/W or NAK abort and allow the 6301 to proceed.

We claim:

1. A register-modelled radio system having a plurality of interdependent radio portions comprising:
   register means for determining or altering the virtual state of a portion of a radio according to parametric data passed to it and
   communication means, coupled to said register means, for communicating parametric data to or from said register means,
   whereby the virtual state of said radio portion may be determined or altered by, respectively, communicating parametric data form or to said register means.

2. A register-modelled radio system having a plurality of interdependent radio processors comprising:
   at least one register-modelled processor means for determining or altering the virtual state of said processor according to parametric data passed to it;

communication means, coupled to said register-modelled processor means, for communicating parametric data to or from said register-modelled processor means; and other processor means, coupled to said communication means, for communicating with said register-modelled processor, whereby the virtual state of said radio processor may be defined or altered by, respectively, communicating parametric data from or to said register-modelled processor means.

3. A register-modelled radio system having a plurality of interdependent radio processors comprising:

a plurality of register-modelled processor means for determining for altering the virtual state of said processor according to parametric data passed to it; and communication means, interconnecting said register-modelled processor means, for communicating said register processor means, whereby the virtual state of said radio processor may be determined or altered by, respectively, communicating parametric data from or to said register-modelled processor means.

4. A register-modelled radio system as claimed in claim 3 wherein said plurality of register-modelled processor means comprises multiple radio frequency modems.

5. A register-modelled radio system as claimed in claim 1, 2 or 3 wherein said register means comprises a peripheral device for a mobile radio.

6. A register-modelled radio system as claimed in claim 1, 2 or 3 wherein said communication means further comprises a serial bus.

7. A register-modelled radio system as claimed in claim 1, 2 or 3 wherein said register means are addressable.

8. A register-modelled radio system having a plurality of interdependent radio processors comprising:

a plurality of register-modelled addressable processor means for determining or altering the virtual state of said processor according to parametric data passed to it and communication means, comprising a serial bus, interconnecting said register-modelled processor means, for communicating between said addressable register-modelled processor means, a communications protocol for passing said parametric data to or from said addressable register-modelled processor means, comprising an information packet, further comprising:

an address an operation code, further comprising:

a primitive operation code chosen from the group of primitive operation codes: reset, read, write, bit set, bit clear, acknowledge, and negative acknowledge, optional data, and error detection data, further comprising:

a cyclical redundancy check packet, whereby the virtual state of said processor may be determined or altered by, respectively, communicating parametric data from or to said addressable register-modelled processor means.

9. A register-modelled radio system as claimed in claim 1, 2, 3 or 8 wherein said parametric data comprises an operation code.

* * * * *